US006743408B2

(12) United States Patent
Lieber et al.

(10) Patent No.: US 6,743,408 B2
(45) Date of Patent: Jun. 1, 2004

(54) DIRECT GROWTH OF NANOTUBES, AND THEIR USE IN NANOTWEEZERS

(75) Inventors: Charles M. Lieber, Lexington, MA (US); Jason H. Hafner, Houston, TX (US); Chin Li Cheung, Cambridge, MA (US); Philip Kim, New York, NY (US)

(73) Assignee: President and Fellows of Harvard College, Cambridge, MA (US)

( * ) Notice: Subject to any disclaimer, the term of this patent is extended or adjusted under 35 U.S.C. 154(b) by 17 days.

(21) Appl. No.: 09/966,812

(22) Filed: Sep. 28, 2001

(65) Prior Publication Data

US 2002/0122766 A1 Sep. 5, 2002

Related U.S. Application Data

(60) Provisional application No. 60/237,347, filed on Sep. 29, 2000.

(51) Int. Cl.$^7$ ................................................. D01F 9/12
(52) U.S. Cl. ............................. 423/447.1; 423/447.2; 423/447.3; 73/105
(58) Field of Search ........................... 423/447.3, 447.1, 423/445 B, 447.2, 445 R; 73/105

(56) References Cited

U.S. PATENT DOCUMENTS

| | | | |
|---|---|---|---|
| 4,663,230 A | 5/1987 | Tennent | 428/367 |
| 5,165,909 A | 11/1992 | Tennent et al. | 423/447.3 |
| 5,753,088 A | 5/1998 | Olk | 204/173 |
| 5,824,470 A | 10/1998 | Baldeschwieler et al. | 435/6 |
| 5,997,832 A | 12/1999 | Lieber et al. | 423/249 |
| 6,063,243 A | 5/2000 | Zettl et al. | 204/164 |
| 6,099,965 A | 8/2000 | Tennent et al. | 428/408 |
| 6,129,901 A | 10/2000 | Moskovits et al. | 423/447.3 |
| 6,146,227 A | 11/2000 | Mancevski | 445/24 |
| 6,159,742 A | 12/2000 | Lieber et al. | 436/164 |
| 6,203,814 B1 | 3/2001 | Fisher et al. | 424/443 |
| 6,210,800 B1 | 4/2001 | Nesper et al. | 428/367 |
| 6,221,154 B1 | 4/2001 | Lee et al. | 117/87 |
| 6,221,330 B1 | 4/2001 | Moy et al. | 423/447.3 |
| 6,250,984 B1 | 6/2001 | Jin et al. | 445/51 |
| 6,283,812 B1 | 9/2001 | Jin et al. | 445/24 |
| 6,325,909 B1 | 12/2001 | Li et al. | 205/106 |
| 6,401,526 B1 * | 6/2002 | Dai et al. | 73/105 |
| 2002/0061662 A1 * | 5/2002 | Bogglid | 438/800 |

FOREIGN PATENT DOCUMENTS

| | | |
|---|---|---|
| WO | WO 96/38705 | 12/1996 |
| WO | WO 98/05920 | 2/1998 |
| WO | WO 00/09443 | 2/2000 |
| WO | WO 00/66485 | 11/2000 |
| WO | WO 00/73205 A1 | 12/2000 |

OTHER PUBLICATIONS

Su et al. "Lattice–Oriented Growth of Single–Walled Carbon Nanotubes") Journal of Physical Chemistry B, Jul. 20, 2000, vol. 10 No. 28., pp. 6505–6508.*

Kong, Jing. et al. "Synthesis of individual single–walled carbon nanotubes on patterned silicon wafers", Nature 395, Oct. 29, 1998, pp. 878–881.*

Wong et al., "Carbon Nanotube Tips: High–Resolution Probes For Imaging Biological Systems", J. Am. Chem. Soc., 120:603–604, (1998).

Wong et al.; "Covalently Functionalized Nanotubes as Nonometer–sized Probes in Chemistry and Biology", Nature, 394 : 52–55, (Jul. 2, 1998).

Wang et al.; "Single–walled 4A Carbon Nanotube Arrays", Nature, 408: 50–51, (Nov. 2000).

Wong et al.; "Covalently–Functionalized Single–Walled Carbon Nanotube Probe Tips for Chemical Force Microscopy", J. Am. Chem. Soc. 120:8557–8558, (1998).

Wang et al.; "Atomic Structure and Electronic Properties of Single–Walled Carbon Nanotubes", Nature 391:62–64, (Jan. 1, 1998).

Woolley et al.; "Direct Haplotyping of Kilobase–Size DNA Using Carbon Nanotube Probes", Nature Biotechnology, 18:760–763, (Jul. 2000).

Zhang et al.; "Heterostructures of Sigle–Walled Carbon Nanotubes and Carbide Nanorods", Science 285:1719–1722, (Sep. 10, 1999).

Journet et al.; "Large–scale Production of Single–Walled Carbon Nanotube by the Electric–arc Technique", Nature, 388:756–758, (Aug. 21, 1997).

Dai et al.; "Nanotubes as Nanoprobes in Scanning Probe Microscopy", Nature 384:147–150, (Nov. 14, 1996).

Cheung et al.; "Carbon Nanotube Atomic Force Microscopy Tips: Direct Growth by Chemical Vapor Deposition and Application to High–Resolution Imaging", PNAS, 97(8):3809–3813, (Apr. 11, 2000).

Kelly et al.; "Threefold Electron Scattering on Graphite Observed with C60—Adsorbed STM Tips", Science 273:1371–1373, (Sep., 6, 1996).

(List continued on next page.)

*Primary Examiner*—Stuart L. Hendrickson
*Assistant Examiner*—Peter J Lish
(74) *Attorney, Agent, or Firm*—Dana M. Gordon; Foley Hoag LLP

(57) ABSTRACT

A method of producing carbon single wall nanotubes (SWNT) by CVD is disclosed. The SWNTs are grown on a metal-catalyzed support surface, such as a commercially available silicon tips for atomic force microscopes (AFM). The growth characteristics of the SWNTs can be controlled by adjusting the density of the catalyst and the CVD growth conditions. The length of the SWNTs can be adjusted through pulsed electrical etching. Nanotubes of this type can find applications in nanotubes structures with defined patterns and for nano-tweezers. Nano-tweezers may be useful for manipulating matter, such as biological material, on a molecular level.

6 Claims, 18 Drawing Sheets

OTHER PUBLICATIONS

Fan et al.; "Self-Oriented Regular Arrays of Carbon Nanotubes and their Field Emission Properties", Science, 283:512–514, (Jan. 22, 1999).

Thess et al..; "Crystalline Ropes of Metallic Carbon Nanotubes", Science 273:483–487, (Jul. 26, 1996).

Hafner et al.; "High-Yield Assembly of Individual Single-Walled Carbon Nanotube Tips for Scanning Probe Microscopies", The Journal of Physical Chemistry B, 105(4):743–746, (Feb. 1, 2001).

Nikolaev et al.; "Gas-phase Catalytic Growth of Single-Walled Carbon Nanotubes from Carbon Monoxide", Chemical Physics Letters 313:91–97, (Nov. 5, 1999).

Sinnott et al.; "Model of Carbon Nanotube Growth Through Chemical Vapor Deposition", Chemical Physics Letters 315:25–30, (Dec. 17, 1999).

Single-Walled Nanotubes Produced by Metal-Catalyzed Disproportionation of Carbon Monoxide, Chemical Physics Letters 260: 471–475, (Sep. 27, 1996).

Hafner et al.; "Catalytic Growth of Single-Walled Carbon Nanotubes from Metal Particles", Chemical Physics Letters, 296 : 195–202, (Oct. 30, 1998).

Anderson et al.; "Influence of the Support on the Structural Characteristics of Carbon Nanofibers Produced From the Metal-Catalyzed Decomposition of Ethylene", Chem. Mater 12:823–830, (2000).

Cheung et al.; Growth and Fabrication with Single-Walled Carbon Nanotube Probe Microscopy Tips , Applied Physics Letters, 76(21):3136–3138, (May 22, 2000).

Kyotani et al.; "Formation of Ultrarine Carbon Tubes by Using an Anodic Aluminum Oxide Film as a Template", Chemistry of Materials 7(8):1427–1428, (Aug. 1995).

Li and Liu; "Preparation of Monodispersed Fe–Mo Nanoparticles as the Catalyst for CVD Synthesis of Carbon Nanotubes", Chem. Mater. 13:1008–1014, (2001).

Han et al.; "Synthesis of Silicon Nitride Nanorods Using Carbon Nanotube as a Template", Applied Physics Letters 71(16):2271–2273, (Oct. 20, 1997).

Ago et al.; "Dispersion of Metal Nanoparticles for Aligned Carbon Nanotube Arrays", Applied Physics Letters, 77(1):79–81, (Jul. 3, 2000).

Li et al.; "Highly–Ordered Carbon Nanotube Arrays for Electronic Applications", Applied Physics Letters, 75(3):367–369, (Jul. 19, 1999).

Akita et al.; "Nanotweezers Consisting of Carbon Nanotubes Operating in an Atomic Force Microscope", Applied Physics Letters 79(11):1691–1693, (Sep. 10, 2001).

Cheung et al.; "Growth and Fabrication with Single-walled Carbon Nanotube Probe Microscopy Tips", Applied Physics Letters, 76(21):3136–3138, (May 22, 2000).

Dai et al.; "Nanotubes as Nanoprobes in Scanning Probe Microscopy", Nature, 384 : 147–149, (Nov. 14, 1996).

Hafner et al.; "Direct Growth of Single-walled Nonotube Scanning Probe Microscopy Tips", J. Am. Chem. Soc. 212:9750–9751, (1999).

Hafner et al.; "Growth of Nanotubes for Probe Microscopy Tips", Nature, 398:761–762, (Apr. 29, 1999).

Kim and Lieber; "Nanotube Nonotweezers", Science 286: 2148–2150, (Dec. 10, 1999).

International Search Report, Completed on Feb. 2, 2002 and mailed on Feb. 22, 2002.

Nakayama et al.; "Microprocess for Fabricating Carbon–Nanotube Probes of a Scanning Probe Microscope", J. Vac, Sci. Techn. B, 12(2):661–664, (Mar./Apr., 2000).

Qin et al.; "Growing Carbon Nanotubes by Microwave Plasma–Enhanced Chemical Vapor Deposition", Applied Physics Letters 72(26):3437–3439, (Jun. 29, 1998).

Stevens et al.; "Carbon Nanotubes as Probes for Atomic force Microscopy", Nanotechnology 11:1–5, (2000).

Database CA 'Online', Chemical Abstracts Service, Columbus Ohio, Database AccessionNo. 133: 181653 CA XP 002187925.

International Search Report Completed on Jan. 22, 2002 and Mailed on Feb. 6, 2002.

* cited by examiner

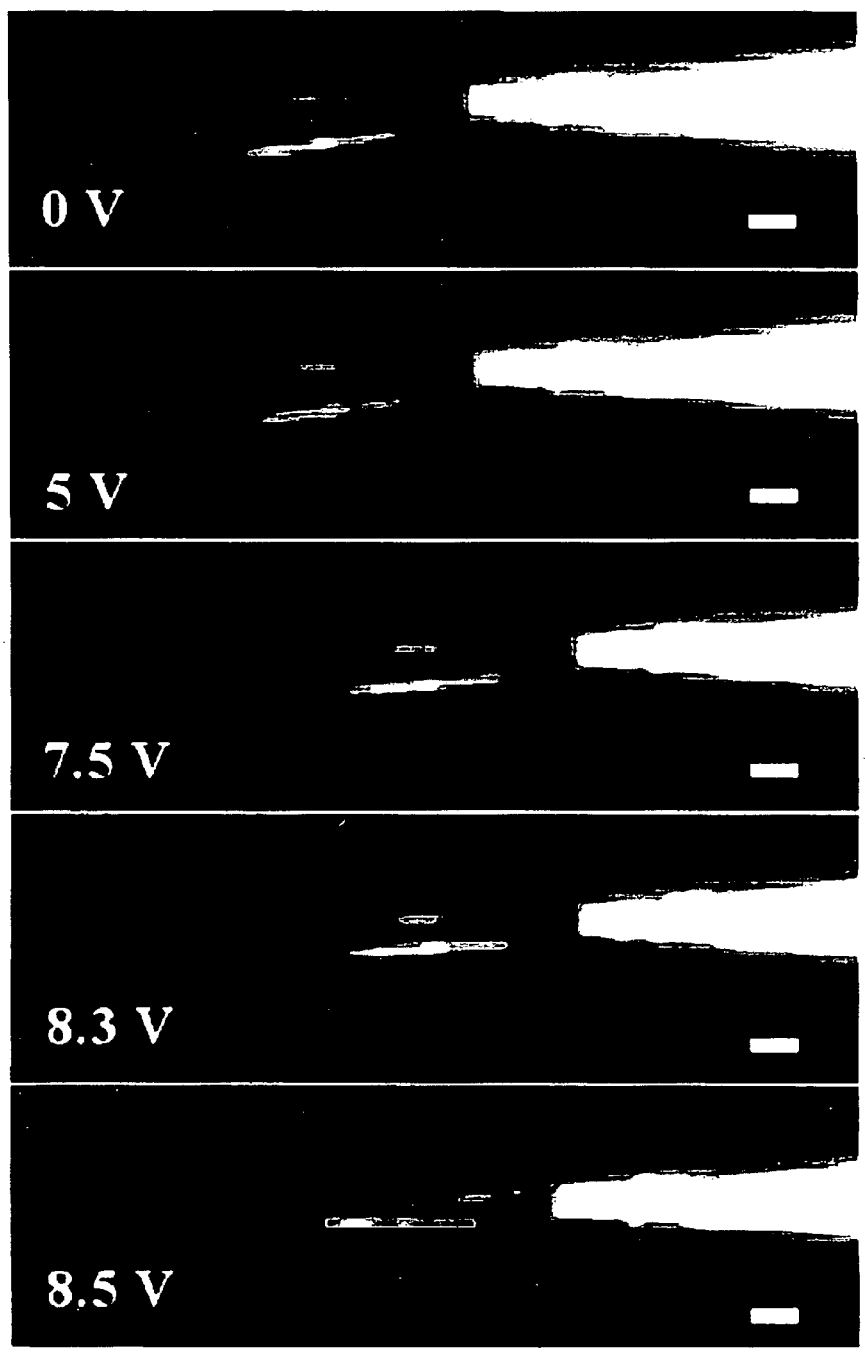

Catalyst: FeOx 6L (black arrow)     Majority of catalyst size: 4-6nm
Carbon Source: C$_2$H$_4$, SWNT (white arrow)     Majority of SWNT size: 4nm Catalyst: FeOx 2L
Carbon source: CO
0.8 nm SWNT (white arrow)

Catalyst: FeOx 2L (black arrow)
Carbon source: CO, SWNT (white arrow)
Majority of catalyst size: 1.5-3.5 nm
Majority of nanotube size: 1.3-2.3 nm Catalyst: FeOx 6L(white arrow)
Carbon source: C$_2$H$_4$, SWNT (black arrow)

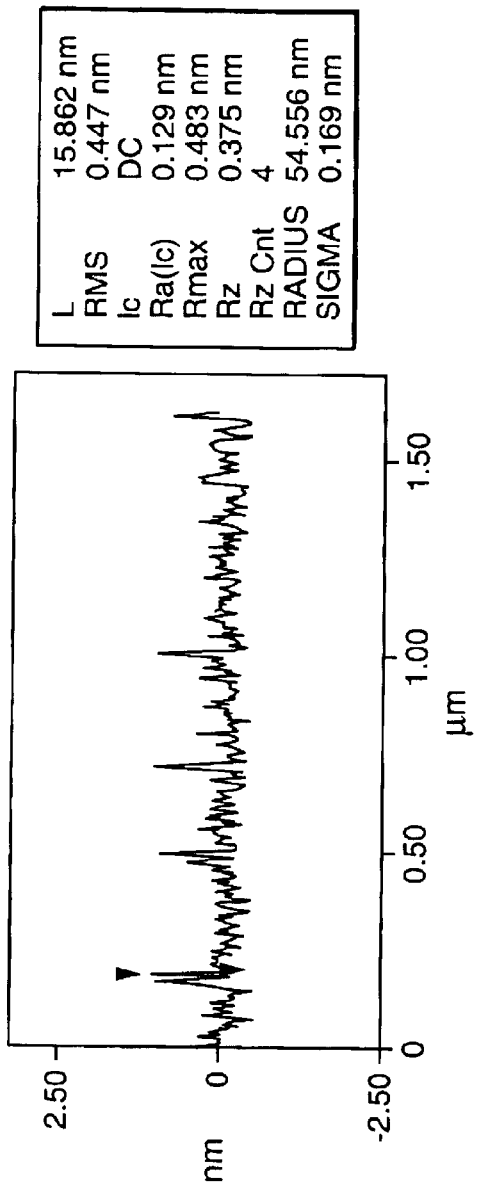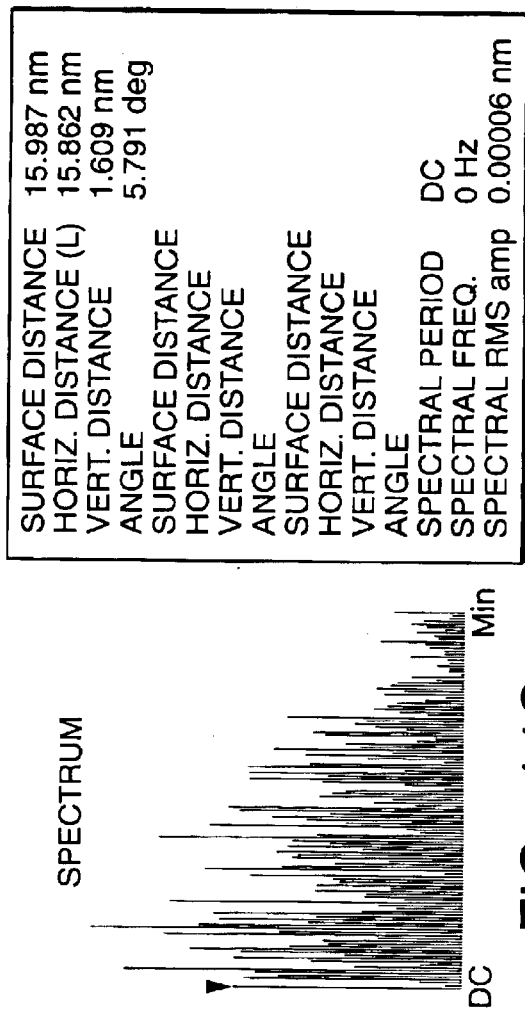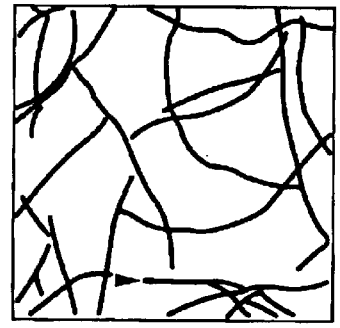

DIRECT GROWTH OF NANOTUBES, AND THEIR USE IN NANOTWEEZERS

RELATED APPLICATION INFORMATION

This application claims the benefit of priority to Provisional Patent Application 60/237,347, filed Sep. 29, 2000, which application is hereby incorporated by reference in its entirety.

GOVERNMENT SUPPORT

This invention was made with support provided by the Air Force Office of Scientific Research (contract numbers F49620-97-1-0005 and F49620-97-1-0084); therefore, the government has certain rights in the invention.

BACKGROUND OF THE INVENTION

Carbon nanotubes are ideal structures for the tips used in scanning probe microscopy, such as atomic force microscopy (AFM), since carbon nanotubes (i) have an intrinsically small diameter, which is comparable to that of molecules in the case of single walled nanotubes (SWNT), (ii) have a high aspect ratios, (iii) can buckle elastically, and (iv) can be selectively modified at their ends with organic and biological species to create functional probes. In the past, most nanotube probe tips have been made by mechanical attachment of multi-walled nanotube (MWNT) and SWNT bundles to silicon tips in optical or electron microscopes. Nanotube tips made in this way have been used to demonstrate, for example, their potential for high-resolution and chemically-sensitive imaging, but also highlighted limitations. Specially, mechanical tip fabrication is a time consuming one-by-one process, and the resolution of tips can vary widely due to their bundle structures. More recently, direct catalytic growth of nanotubes from conventional tips has been explored, which demonstrated that individual multi-walled nanotubes (MWNT) could be grown by CVD from the ends of Si tips with controlled orientation. In this growth method of nanotube probes, commercial AFM tips were selectively etched to create nanopores, which were created at the apex of silicon tips by chemical etching or focused ion beam milling, to guide the growth of nanotube probes in an orientation ideal for imaging. Electrochemically or electrophoretically deposited iron in the nanopores was used to catalyze the selective CVD growth of nanotubes with an orientation controlled by the pores. Tips synthesized using the electrochemically deposited iron catalyst were shown to consist reproducibly of individual 3–5 nm radii MWNTs oriented optimally for high-resolution imaging. Significantly, these studies demonstrated that a well-defined synthetic approach could be used to prepare directly nanotube probes, thus opening the possibility of precise control over nanotube size and thereby tip resolution. Recently, SWNT tips having much smaller radii of only 1–3 nm were reproducibly grown using well-defined iron oxide nanocluster catalysts These latter tips begin to approach the theoretical minimum size expected for individual SWNTs.

The pore-growth method has demonstrated the potential of CVD to grow directly controlled diameter nanotube tips, although it still has limitations. In particular, the preparation of nanopores can be time-consuming and may not place individual SWNTs at the optimal location on the flattened apex. It would therefore be desirable to develop a reliable growth method for SWNTs that eliminates the need for nanopores.

Scanning probe microscopes (SPMs), such as the scanning tunneling microscope (STM) and atomic force microscope (AFM), are now widely used for these purposes with the capability of working at length scales as small as a single atom. However, the single probe tips employed in SPMs limit these tools in manipulation and the measurement of physical properties; for example, a single tip cannot grab an object, and a second electrical contact must be made to structures for electrical measurements. Two probes in the form of a tweezers could overcome these limitations of SPMs, and thus may enable new types of fabrication and facile electrical measurements on nanostructures.

Micrometer scale electromechanical tweezers, which represent basic micro-electromechanical systems, employing tungsten as a tip material, have previously been fabricated on silicon. Tungsten deposition and subsequent processing were used to produce 200 $\mu$m long by 2.5 $\mu$m wide tungsten arms that could be closed by applying a potential (V) of ca. 150 volts and then opened again by reducing V to zero. The potential difference between the tungsten arms of the tweezers produces an attractive electrostatic force that can overcome the elastic restoring force of the beams in closing the tweezers. Smaller tweezers with 30 $\mu$m long by 0.25 $\mu$m long single crystal silicon arms, which responds at a potential of 45 V, have also been fabricated using conventional lithography and processing steps. Such micro-tweezers, if removed from the substrate support, could be useful tools in manipulation. However, due to their relatively large size and large actuating voltages these tweezers are not suitable for work in the nanometer regime.

SUMMARY OF THE INVENTION

In one aspect of this invention provides for a method of producing a carbon nanotube tip, comprising the steps of: providing a tip assembly; applying a metallic catalytic material to the tip assembly; inserting said metallic catalytic material bearing probe into a CVD reactor; and exposing said metallic catalytic material bearing probe to a gaseous atmosphere comprising a carbon containing gas thereby producing a tip bearing a carbon nanotube tip. In an embodiment, the tip assembly comprises silicon.

In another embodiment, the tip assembly is a multifaced probe. In another embodiment, one or more faces of the tip assembly comprises a mask. In an even further embodiment, the mask is removable. In one embodiment, the multifaced probe comprises silicon.

In another embodiment, the method produces a carbon nanotube tips on an array of tip assemblies.

In another emodiment, the metallic catalytic material is selected from the group consisting of metals, metal oxides, metallic salts, metallic particles and metallic colloids. In a further embodiment, the metallic catalytic material is selected from the group consisting of iron salts, nickel salts, cobalt salts, platinum salts, molybdenum salts, and ruthenium salts. In a further embodiment, the metallic catalytic material is selected from the group consisting of iron colloids, nickel colloids, cobalt colloids, platinum colloids, molybdenum colloids, and ruthenium colloids. In an even further embodiment, the metallic catalytic material is a ferric salt. In another embodiment, the metallic catalytic material is ferric nitrate. In another embodimetn, the metallic catalytic material is an iron colloid In an further embodiment, the metallic catalytic material is in solution. In another embodiment, the solution comprises an alcohol. In a further embodimetn, the alcohol is selected from the group consisting of methanol, ethanol and isopropanol.

In another embodiment, the carbon containing gas is ethylene. In yet another embodiment, the carbon nanotube tip is a SWNT. In another embodiment, the carbon nanotube tip is a bundle of SWNT. In another embodiment, the carbon nanotube tip is a MWNT.

In a further embodiment, the steps of producing a carbon nanotube tip comprises the step of shortening the carbon nanotube tip by electrical etching. In an even further embodiment, electrical etching comprises applying voltage pulses of a predetermined voltage between the nanotube tip and a support surface.

In another aspect, the invention provides for a method of fabricating nanotube-based nanostructures by controlled deposition of nanotube segments of a nanotube tip, comprising the steps of: biasing the nanotube tip at a starting location on a substrate at a predetermined voltage; scanning the tip along a predetermined path; and applying a voltage pulse at a higher voltage than the predetermined voltage to disconnect the tip from the nanotube segment on the substrate. In a further embodiment, the nanotube tip is a single wall nanotube.

In another aspect, the invention provides for a method of producing nano tweezers made of carbon nanotube tips, comprising the steps of: providing a support surface; applying at least two independent electrodes to the support surface; and applying at least one carbon nanotube tip on each of the electrodes, wherein the spacing between respective end portions of the carbon nanotube tips changes in response to a voltage applied between the at least two electrodes. In a further embodiment, applying at least one carbon nanotube tip comprises the steps of: applying metallic catalytic material to the at least one electrode; and inserting said electrode into a CVD reactor; and exposing said electrode to a gaseous atmosphere comprising a carbon containing gas, thereby producing a tip bearing a carbon nanotube tip. In a further embodiment, the carbon nanotube tip is a single SWNT. In a further embodiment, wherein the carbon nanotube tip is a bundle of SWNTs. In a further embodiment, wherein the carbon nanotube tip is a MWNT.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIGS. 7A–E show the electromechanical response of the nanotube nano-tweezers. Dark field optical micrographs of the nanotube arms for potentials of 0V (FIG. 7A), 5V (FIG. 7B), 7.5V (FIG. 7C), 8.3V (FIG. 7D) and 8.5V (FIG. 7E), respectively (scale bars=1 $\mu$m);

FIG. 14 shows a section analysis of a medium-sized SWNT;

DETAILED DESCRIPTION

Figure 1A:
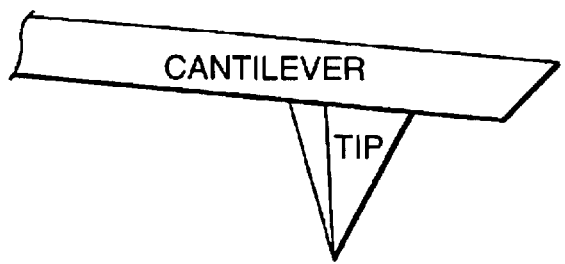
FIG. 1A shows schematically an AFM cantilever assembly.

According to one aspect of the invention, a method is disclosed for producing a single wall carbon nanotube tip which includes carbon nanotube tip, the steps of first providing a tip assembly, applying a metallic catalytic material to the tip assembly, inserting said metallic catalytic material bearing probe into a CVD reactor, and exposing said metallic catalytic material bearing probe to a gaseous atmosphere comprising a carbon containing gas thereby producing a tip bearing a carbon nanotube tip.

An AFM microscope, or a SPM (scanning probe microscope) for example, comprises a probe. A probe typically comprises a mounting block, cantilever and tip assembly depending from the cantilever. The tip assembly typically further comprises a tip having substantial atomic sharpness disposed. The tip of the tip assembly follows the surface to be imaged, and in most instances moves up or down due to the tip interaction in some manner with the atoms for example, on the surface being imaged.

In an embodiment, isolated SWNT are grown on a tip assembly by CVD so that they are arranged approximately normal to the tip assembly surface. In one embodiment, the tip assembly comprises ceramic or ceramic oxide. In another embodiment, the tip assembly may comprise silicon, silicon oxide, alumina, or aluminum oxide. In a particular embodiment, the tip assembly comprises silicon.

In one embodiment, the tip assembly may be a pointed surface, a multi-faced surface, a cylindrical surface or a pyramidal surface. In another embodiment, the tip assembly may be designed geometrically to optimize position of the nanotube tip. In a particular embodiment, the tip assembly may a pointed or multifaced surface made of silicon, such as a silicon tip for an atomic force microscope. There are two basic structural classes of carbon nanotubes: single-walled nanotubes (SWNTs) and multi-walled nanotubes (MWNTs). SWNTs may consist of a single seamless cylinder with radii ranging from about 0.35 to about 2.5 nm, while MWNTs consist of multiple concentric graphene cylinders with radii ranging from about 3 to about 50 nm. DWNTs (double walled nanotubes) are also possible.

The isolated SWNTs may be grown on the surface of the tip assembly by applying to the tip assembly a catalytic material. In one embodiment, the catalytic material may be a metal, a metal oxide, a metal particle, a metal oxide particle, or a combination of two or more of these components. In a particular embodiment, the metal is a Group VIII transition metal. In another embodiment, the metal is selected from the group consisting of iron, ruthenium, nickel, cobalt, platinum, and molybdenum. In yet another embodiment, the metal oxide comprises a metal selected from the group consisting of iron, ruthenium, nickel, cobalt, platinum, and molybdenum.

In yet another embodiment, the catalytic material is a metallic salt. In another embodiment, the metallic salt is selected from the group consisting of iron, nickel, cobalt, platinum molybdenum salts, or a combination of these. In one embodiment, the salt is a nitrate salt. In a particular embodiment, the metallic salt is ferric nitrate.

In another embodiment, the catalytic material may be ferric chloride, ferric acetate, ferric citrate, ferrous sulfate, ferrous perchlorate, ferrous oxide, ferric oxide, ferric hydroxide, or cobaltous nitrate.

In an embodiment, the catalyst may comprise an oxide supported metallic particle. The metal catalyst may include a solution of alumina-supported Fe—Mo or ferric nitrate which may be diluted with an alcohol, such as ethanol or isopropanol, between 100 and 2000, preferably between 200 and 1600 for $FeO_x$ (6L) and between 200 and 400 for $FeO_x$ (2L).

In one embodiment, a very thin layer of a metal, metallic particle or metal oxide may be deposited onto the tip assembly. The metal, metallic particle or metal oxide may be deposited by applying it to the surface using evaporation techniques, dipping, electrodeposition, or other methods known to those skilled in the art. In a particular embodiment, a solution comprising a metallic salt and alcohol is applied to a tip assembly. In one embodiment the alcohol is selected from the group consisting of methanol, ethanol, and propanol. In a particular embodiment, the alcohol is isopropanol.

In another embodiment, diameter controlled carbon nanotube tips are made using metallic colloids with CVD. In one embodiment, different size ranges of metallic colloid catalytic particles were produced with ligand alkanoic acids or alkenoic acids of different chain lengths. In one embodiment, the metallic colloid catalytic particles are selected from the group consisting of iron, nickel, cobalt, platinum, molybdenum, and ruthenium colloid catalytic particles, and colloid catalytic alloys of combinations of these metals. In one embodiment, the metallic alloy colloid particle is a iron-molybdenum alloy. For example, the carboxyl groups of the ligand coordinate the metal, e.g., iron, whereas the hydrophobic tails interact with each other to form a cap layer for the iron particle. The ligand may comprise an alkyl moiety or an aminoalkyl moiety. The organic chain length of the ligand may increase from 8 carbon atoms (octanoic acid), to 12 carbon atoms (lauric acid) to 18 carbon atoms (oleic acid); moreover, smaller iron particles of diameter sizes from 12.6+/−1.7 nm, 9.0+/−0.9 nm, to 3.2+/−0.8 nm can be produced. The size distributions of the metallic particles may be further optimized by size precipitation or size focusing techniques such as injection.

In another embodiment, growing the SWNTs on a silicon probe comprises the steps of: treating said silicon probe with metallic colloid particles; placing said silicon wafer in a CVD furnace; and exposing said silicon probe to a gaseous atmosphere comprising a carbon containing gas. In an embodiment, the metallic colloid is selected from the group consisting of iron colloids, nickel colloids, cobalt colloids, platinum colloids, molybdenum colloids, and ruthenium colloids. In a particular embodiment, the metallic colloid is an iron colloid.

In an embodiment, the carbon containing gas is ethylene. In another embodiment, the metallic colloids have diameters of about 3–15 nm. In yet another embodiment, the metallic colloids have a diameter from about 2 nm to about 13 nm. In yet another embodiment, the metallic colloids have a diameter from about 2 nm to about 9 nm. In another embodiment, the metallic colloids have a diameter from about 3 nm to about 5 nm.

In yet another embodiment, the SWNT tip has a diameter from about 2 nm to about 13 nm. In yet another embodiment, the SWNT tip has a diameter from about 2 nm to about 9 nm. In another embodiment, the SWNT tip has a diameter from about 3 nm to about 5 nm.

In one embodiment, the metallic catalytic material on the tip assemblys may be positioned by masking or stenciling the probe. The mask may comprise a material which inhibits nanotube tip production. In an embodiment, the tip assemblys comprise a removable mask. A mask may comprise a polymer, plastic or metal, for example platinum .In one embodiment, the probes are deposited with a layer of a first material over a substrate and then patterning the layer of the first material to define apertures wherever probe tips are to be formed. Next, a layer of a second material is deposited. This process may also form a sacrificial layer of the second material on top of the portions of the first material not removed by the patterning step. The sacrificial layer may at least partially overhangs the apertures in the first material, forming a shadow mask during the deposition process which may give rise to a sharp probe profile. After the formation of the probe tips, the remaining portion of the layer of the first material is removed using, for example a chemical etchant that selectively etches the first material at a much higher rate than the second material. Masks may be further employed to define the structures to be etched. The removing step also removes the sacrificial layer of the second material because the sacrificial layer is lifted off the substrate when the underlying layer of first material is etched away. In a further embodiment, the substrate is scribed and diced. A mask may also be applied using photolithography.

This approach may be readily extended to prepare multiprobe arrays with one or more nanotube tips on each probe. In another embodiment, the method may be used to produce a plurality of nanotube tips. In another embodiment, the growth of single or multiple nanotubes can be controlled by varying the density of the catalyst. In one embodiment, the nanotube tips on the arrays of probes may be used to produce perturbations in a medium, for example a storage medium, for example creating or altering the topographic features or composition, altering the crystalline phase, creating or destructing electronic states, filling or emptying existing electronic states, creating or altering domain structures or polarization states, or creating or altering chemical bonds. These perturbations may be, for example, used as memory storage devices or field emission displays.

In the present invention different approaches for achieving a scan movement of the probes with respect to a medium are made use of. The simplest approach is to move either the whole local probe array while the medium's position remains unchanged, or the other way around. An additional degree of freedom can be achieved if the medium and the local probe array are moved. It is, for example, advantageous to slowly move the storage medium back and forth in a direction parallel to a first axis. The scan excursion of the medium is chosen such that the local probes do not exceed the corresponding storage fields, i.e. the scan excursion is approximately equal to the dimension of the storage fields. At the same time the local probe array is step-wise moved perpendicular. Due to the combined movement of the local probe array and the storage medium, a first row of the storage fields is scanned. Then, the probes jump to the next row before the medium moves back. This next row is now scanned in the opposite direction, and so forth. This approach is known as 'basket-weave scanning' in the area of scanning electron microscopy. One can use a variety of scanning schemes including pulsed and continuous scanning as well as varying speeds. In one embodiment, the probes comprise actuators.

The nanotubes can be shortened by electrical etching, preferably by applying voltage pulses of a predetermined voltage between the nanotube tip and a support surface.

In one embodiment, the catalyst is deposited onto the pyramidal tip or probe of a commercial silicon cantilever-tip assembly and then CVD is used to grow a SWNT tip. In some embodiments, the or SWNTs and small diameter MWNTs prefer to grow along a surface, and therefore, will generally bend to stay in contact rather than grow out from the surface when they encounter an edge. Nanotubes prepared from catalyst deposited on a pyramidal AFM tips or probes will grow along the surfaces until they reach the pyramid edge, and some of the nanotube tips will be directed toward the tip apex along the edges.

Figure 1B:
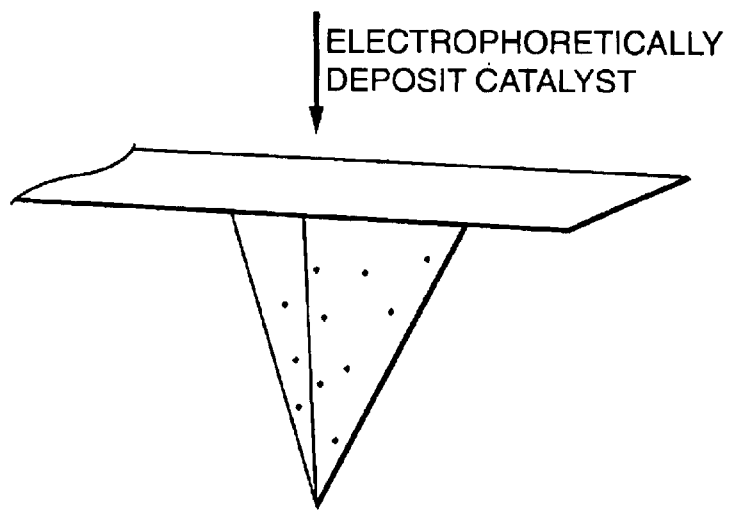
FIG. 1B shows schematically the deposition of a catalyst on the AFM cantilever assembly according the method of the invention.
Figure 1C:
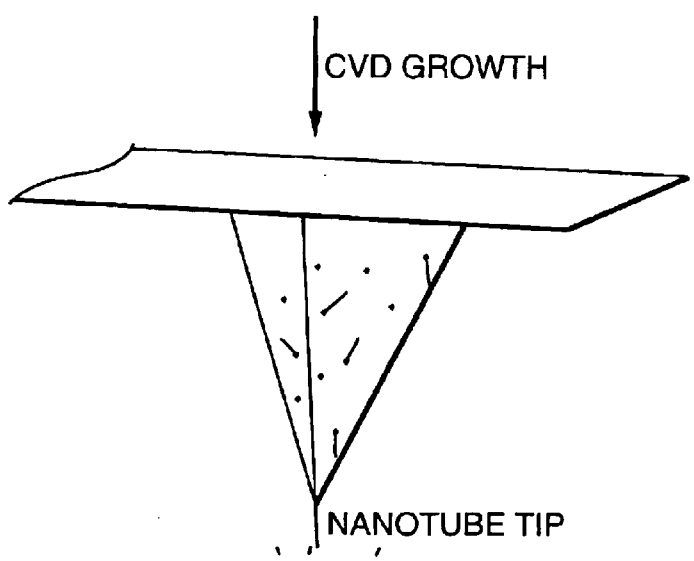
FIG. 1C shows schematically the growth of a carbon SWNT according the method of the invention.

FIGS. 1A–1C show schematically the preparation of a SWNT using the method of the invention. Using a commercially available AFM cantilever assembly (FIG. 1A) having a tip made of, for example, silicon, a catalyst is electrophoretically deposited on the pyramidal tip, as illustrated in FIG. 1B. The cantilever assembly is then inserted into a conventional CVD reactor (not shown) to grow the SWNT probe (FIG. 1C). The CVD reactor can be, for example, in the form of a quartz boat in a 2-foot long quartz tube having a diameter of 2.5 cm and being heated in a tube furnace. The nucleation sites provided for the nanotubes by the catalyst are indicated by the black dots in FIG. 1A. The nanotubes then grow from these nucleation sites in a manner to be described below in detail.

Figure 2A:
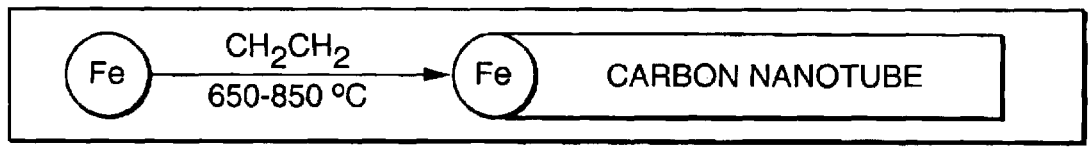
FIG. 2A shows schematically a Fe-catalyzed CVD growth process of nanotubes using ethylene.
Figure 2B:
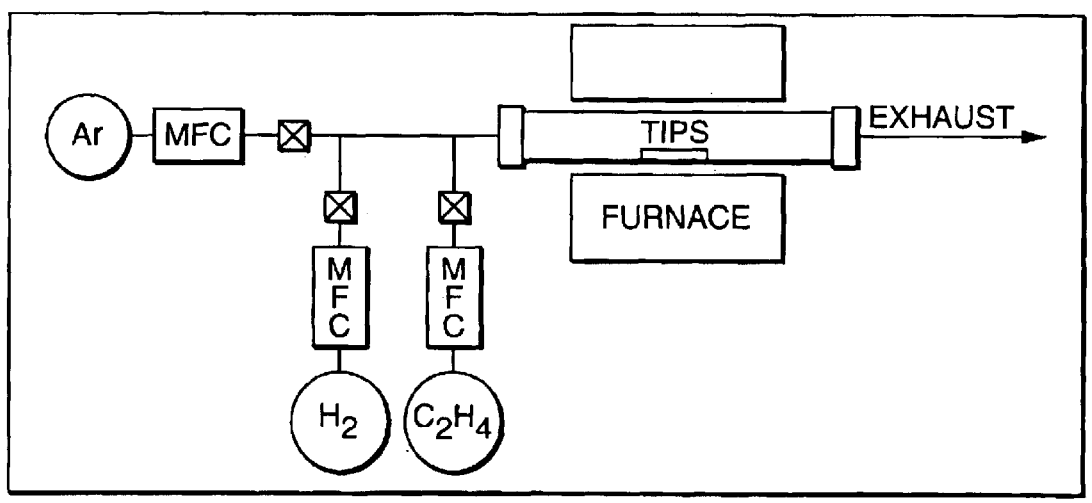
FIG. 2B shows a CVD apparatus for controlled growth of nanotubes.

In the CVD process depicted in FIGS. 2A and 2B, a metal particle catalytically decomposes a hydrocarbon feedstock (for example, $C_2H_4$) and nucleates the growth of a carbon nanotube. This feature of the CVD process used for preparing nanotube probes provides conditions for the reproducible growth of SWNT tips having a consistent size and resolution and hence predictable mechanical and electrical characteristics.

The basis for this approach is the observation that SWNTs and small diameter MWNTs prefer to grow along a surface (due to the attractive nanotube-surface interaction), and therefore, will generally bend to stay in contact rather than grow out from the surface when they encounter an edge. Nanotubes prepared from catalyst deposited on the pyramidal AFM tip will grow along the surfaces (see FIG. 1C) until they reach the pyramid edges, at which point some nanotubes will be directed towards the tip apex along the edges. At the pyramid end, the nanotubes will protrude straight from the apex (rather than bending) to create an ideal tip, because the strain energy cost of bending the nanotube is not compensated by nanotube-surface interactions. This approach is extremely robust and works readily with a wide range of catalysts.

In some embodiments, the diameters of SWNTs grown by CVD can be controlled by the size of the catalyst and the growth process. Advantageously, pre-made colloidal catalyst particles (such as iron, iron oxide , etc) with definite size range can therefore be employed. Likewise, other catalyst preparation methods could also be used, such as electrochemical deposition of iron, etc. For example, SWNTs grown from catalysts having a uniform type and size range can have diameters that range from slightly bigger than to much smaller than the catalyst size.

In one embodiment, a metallic colloid solution comprising a metallic colloid and a solvent may be applied to the tip assembly. The solvent may be any high boiling point solvent, e.g., toluene, or dioctyl ether.

Chemical vapor deposition with appropriate flux of hydrocarbon gas and iron nanoparticles may catalyzed the growth of carbon nanotubes with diameters defined by the sizes of catalytic particles. The carbon source, may be for example, ethylene.

In one embodiment, two general classes of nanotube tips can be grown: individual SWNT and SWNT bundle tips. Bundle tips can be made relatively long while maintaining sufficient stiffness for high-resolution imaging of deep trenches or tall structures, and individual SWNT tips provide ultimate resolution for relatively short tips. Either type of tip can be selectively grown through variation of the catalyst density: a high density of catalyst produces a bundle tips by the surface growth mechanism, and low density catalyst yields individual tubes.

Figure 3A:
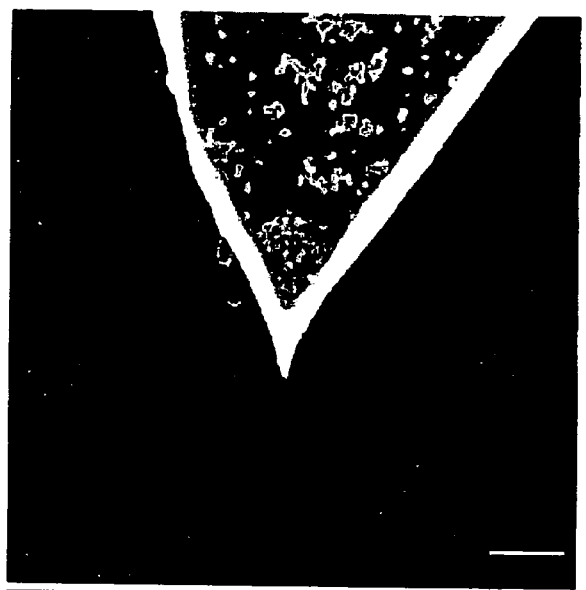
FIG. 3A shows a field-electron (FE) SEM image of a CVD nanotube tip grown from a Si cantilever/tip assembly using the method of the invention (scale bar 500 nm)
Figure 3B:
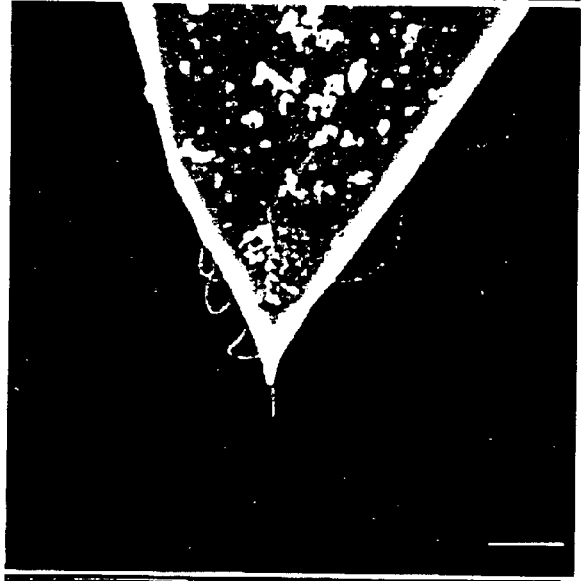
FIG. 3B shows a FE-SEM image of the nanotube tip of FIG. 3A after shortening by pulse etching(scale bar 500 nm)
Figure 3C:
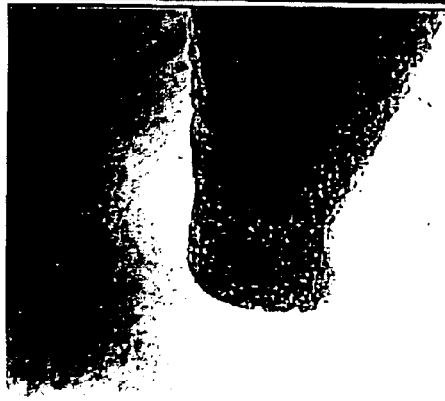
FIG. 3C shows an enlarged FE-SEM image of the nanotube tip of FIG. 3B, with the two nanotubes comprising the tip are in the bottom center (scale bar 20 nm)

Well-defined SWNT tips can be formed reproducibly by CVD growth with ethylene using for example, electrophoretically-deposited supported Fe—Mo and colloidal Fe-oxide catalysts. Representative electron microscopy images of a nanotube tip produced from the supported Fe—Mo catalyst after three minutes growth in 1:200:300 $C_2H_4$:$H_2$:Ar at about 650° C.–850° C. are shown in FIGS. 3A–C. Field-emission scanning electron microscopy (FE-SEM) images demonstrate that nanotube tips prepared in this way protrude from the pyramid apex and illustrate the surface guiding effect discussed above.

As shown in FIG. 3A, nanotubes typically protrude from the edges of the pyramid with a density of approximately one per micron. However, at least 90% of the pyramids have a nanotube protruding directly from the apex. The apexes have radii of curvature of 5–20 nm (which is significantly smaller than the average spacing between nanotubes), suggesting that a surface-growth mechanism is responsible for the growth characteristics.

The as-grown nanotube tips are typically too long (i.e., too flexible) for high-resolution imaging and are shortened using electrical etching. FIG. 3B shows a field emission scanning electron microscope (FE-SEM) image after the nanotube tip shown in FIG. 3A has been shortened by pulsed etching. Importantly, the nanotube tip remains attached after this procedure, and no other major changes are observed (e.g., no material is transferred to the tip apex). Although the FE-SEM image indicates that the nanotube tips are very thin, the tube diameter itself cannot be determined quantitatively, and transmission electron microscopy (TEM) has to be used instead to define the diameter and structure. A TEM image of this shortened nanotube tip (FIG. 3C) shows that the nanotube consists of two individual nanotubes that have merged at the Si-apex. Each of the nanotubes is a SWNT with a diameter of approximately 2.5 nm. This image also serves to highlight the unique resolution advantage of the nanotube probes compared with conventional Si tips.

The observation that this tip has a two tube structure is not surprising since the highly flexible individual nanotubes can line-up during the surface growth process described above. As mentioned above, individual SWNT tips, larger bundles and small diameter MWNTs can be controllably grown through variations in the growth conditions. For example, whether the tip is a single SWNT or bundle can be controlled by the density of the catalyst and the growth time since these factors will determine the probability that single SWNTs encounter each other during surface growth. Second, it is likely that both individual tube and bundle tip structures will be useful for imaging. For example, a single SWNT may provide the ultimate resolution but this will require that the tip be on the order of only 10 nm in length (so that thermally-excited vibrations do not limit resolution). Indeed, the enhanced rigidity afforded by the two nanotube tip of FIG. 3C, which can still expose a single SWNT at the very tip end, could be more desirable for many applications.

These structurally attractive SWNT tips can function as robust, high-resolution probes in AFM experiments. First, the SWNT tips exhibit reversible buckling similar to mechanically-attached SWNTs nanotubes and CVD MWNT tips. The buckling behavior demonstrates that the CVD SWNT tips have high structural quality and remain strongly attached to the pyramids. The resolution of the SWNT tips was characterized by imaging 5.7 and 2 nm diameter gold nanoparticles standards, suggesting that effective tip radii of 3 nm or less can be obtained. These results demonstrate quite clearly the uniqueness of SWNT tips for ultrahigh resolution imaging. Since these nanotube probes, like all tips, ultimately fail, the CVD process can advantageously be repeated at least 5–6 times to provide a new nanotube tip without replacing the catalyst.

As discussed above, tip length can be optimized for imaging by electrical etching, preferably pulse etching, which allows tips to be shortened with at least 2 nm control. The individual SWNT tips require relatively tight constraints on tip length to avoid loss of resolution due to thermal vibrations. It has been found that the amplitude of the tip vibration as a function nanotube length for several discrete diameters for a radius of an individual SWNT tip of 0.5 nm, the length will need to be on the order of 10–20 nm to avoid loss of resolution. In other words, the nanotube length has to be precisely controlled to take advantage of the potential resolution enhancements of individual SWNT tips. As mentioned above, one method for controlling the length is an electrical etching method—by determining the voltage dependence—which allows control of the tip shortening process on a nanometer scale. According to one aspect of the invention, pulsed electrical etching can be used to remove portions of the nanotube, wherein voltage pulses of controlled amplitude are applied between the nanotip and a conducting surface that is being imaged. The amount removed from the tip by the electrical pulses depends directly on pulse height, i.e., the peak voltage, with the length being reproducibly reduced in steps of ca. 2 nm or larger. The current shortening process hence provides sufficient control to optimize the length of individual SWNT tips for imaging applications.

In another aspect, well-defined SWNT tips can also be used to fabricate nanotube-based nanostructures by controlled deposition of segments of the tips in defined patterns.

In one embodiment, a position can be chosen for the building of the nanostructure, for example, on top of a surface, or between electrode structures. An AFM picture of the location may be used as an orientation map for the structure construction. A computational program to control the movement and position of the AFM tip may be used.

Figure 4A:
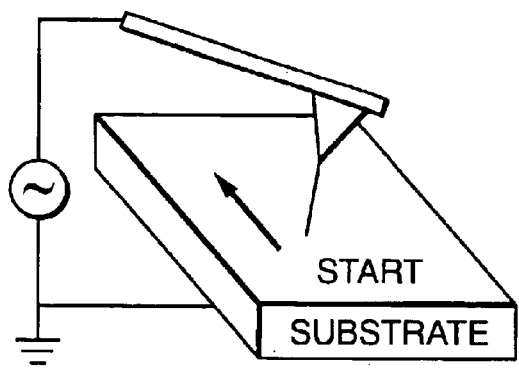
FIG. 4A shows schematically the deposition of a segment of a SWNT tip onto a substrate, with the nanotube tip positioned at the desired start point.
Figure 4B:
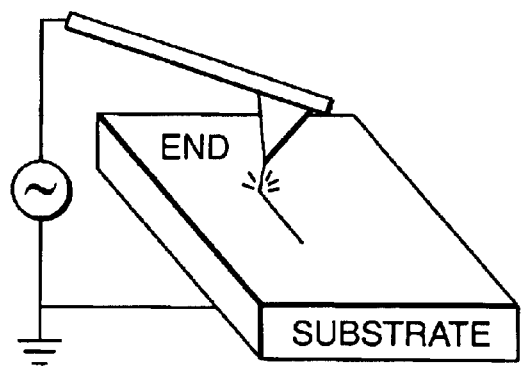
FIG. 4B shows schematically the nanotube tip of FIG. 4A being scanned in a predefined pattern, with a voltage pulse separating the tip from deposited nanotube structure at the end of the scan.
Figure 4C:
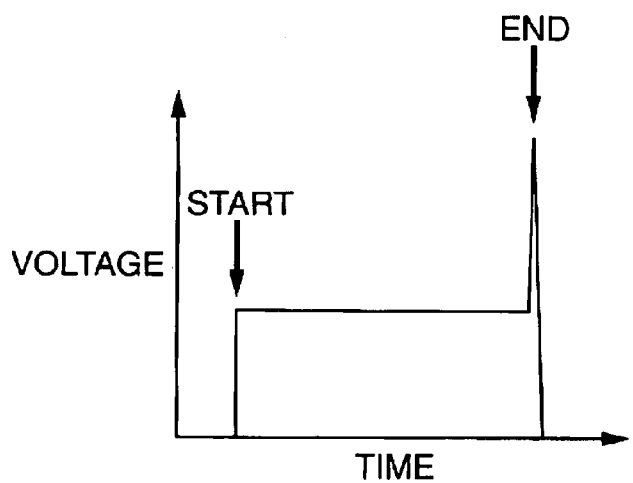
FIG. 4C shows schematically the voltage applied between the tip and the substrate during the deposition process.

This approach is illustrated schematically in FIGS. 4A–C. To deposit a SWNT segment in a specific location, the tip is first biased at –6 to –12V at the starting point (FIG. 4A), and then the tip is scanned along a set path (FIG. 4B). To complete the deposition, a voltage pulse is used to disconnect the tip from the nanotube segment on the substrate or tip assembly. The voltage plus used to disconnect the tip is typically 10–25V with duration about 100 micro seconds. FIG. 4C shows a plot of the applied voltage during the deposition process.

Figure 5A:
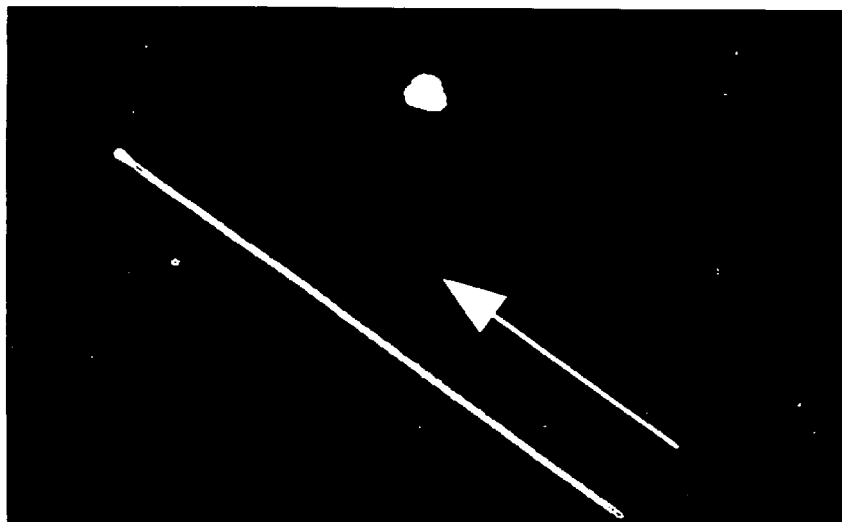
FIG. 5A is an AFM image of a SWNT deposited along the direction of the arrow.
Figure 5B:
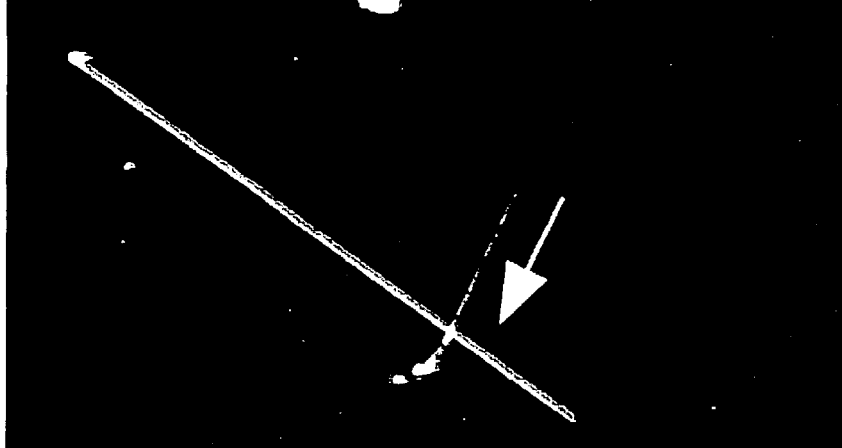
FIG. 5B is an AFM image of a cross SWNT structure made a second nanotube lithography step.
Figure 5C:
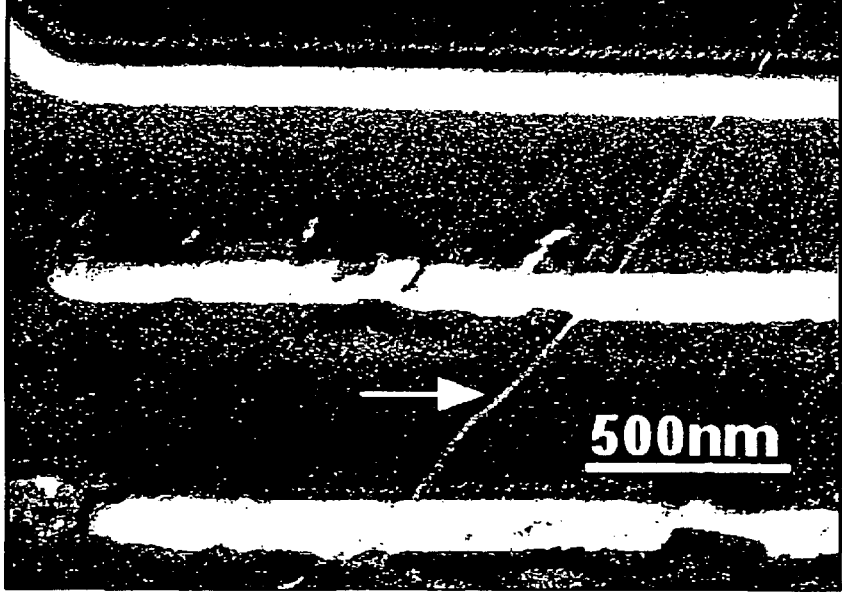
FIG. 5C is a FE-SEM image of a SWNT deposited across three 40 nm high gold electrodes (nanotube indicated by white arrow)

FIGS. 5A–C illustrate examples of this novel nanofabrication approach. First, a 4.8 nm diameter SWNT bundle was deposited as a 1.5 $\mu$m long line across the surface along the direction of the arrow (FIG. 5A). This method can produce very a straight structure, since the tube-surface forces have no effect during deposition. In the second step, a thinner 2.1 nm SWNT was deposited over this small bundle at a near perfect 90 degree angle to create a SWNT crossed junction (FIG. 5B). As indicated in FIG. 5C, SWNT segments can also be deposited directly over prefabricated metal electrodes which could facilitate the fabrication and testing of novel nanotube devices. Related studies of MWNTs bundle tips have shown that MWNTS can be "cleaved" from a bundle by the lateral shear force present during scanning.

Figure 6A:
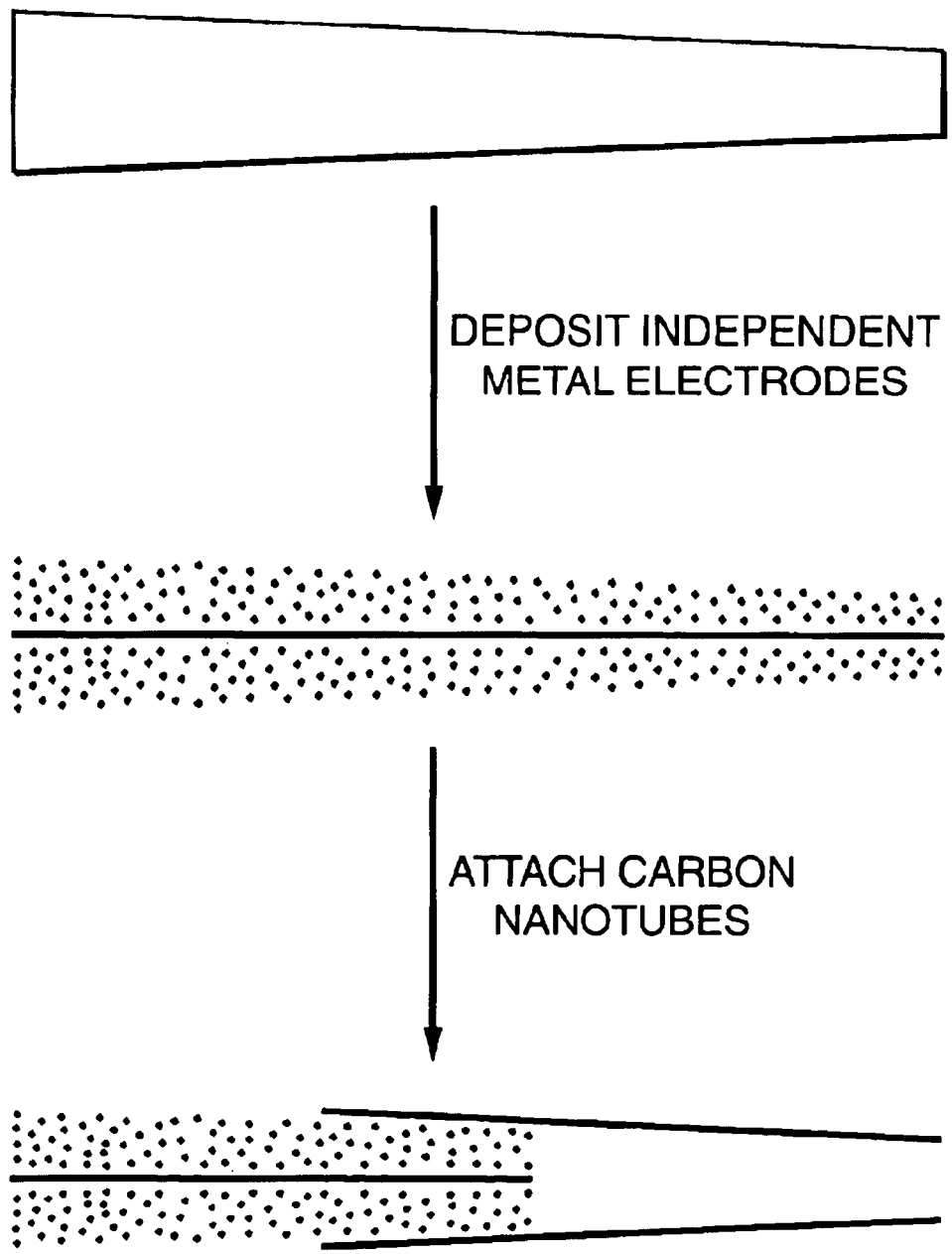
FIG. 6A shows schematically the fabrication of carbon nanotube nano-tweezers by depositing two independent metal electrodes and attaching carbon nanotubes to the electrodes.

In another aspect of the invention, a method for producing nanotweezers comprising single or multiple wall nanotips is provided. This method comprises providing a tip assembly or surface, applying at least two electrodes to the support surface, applying a metal catalyst to the electrodes, depositing by CVD at least one nanotube tip on each electrode wherein the spacing between respective end portions of the carbon nanotube tips changes in response to a voltage applied between at least two electrodes. Carbon nanotubes may be used for nanoscale electromechanical devices such as nanotweezers as they exhibit remarkable mechanical toughness and a high electrical conductivity down to diameters as small as 1 nm. The fabrication of nanotube nano-tweezers is depicted schematically in FIG. 6A. First, free-standing, electrically-independent electrodes made of, for example, gold are deposited onto tapered glass micropipettes, which can be routinely made with end diameters of 100 nm. Thereafter, carbon nanotubes are attached to the independent Au electrodes either by using an optical microscope, attaching the nanotubes to the electrodes in an SEM or by directly growing the arms of the tweezers by CVD in manner similar to that used for the fabrication of single nanotube SPM tips described above.

Figure 6B:
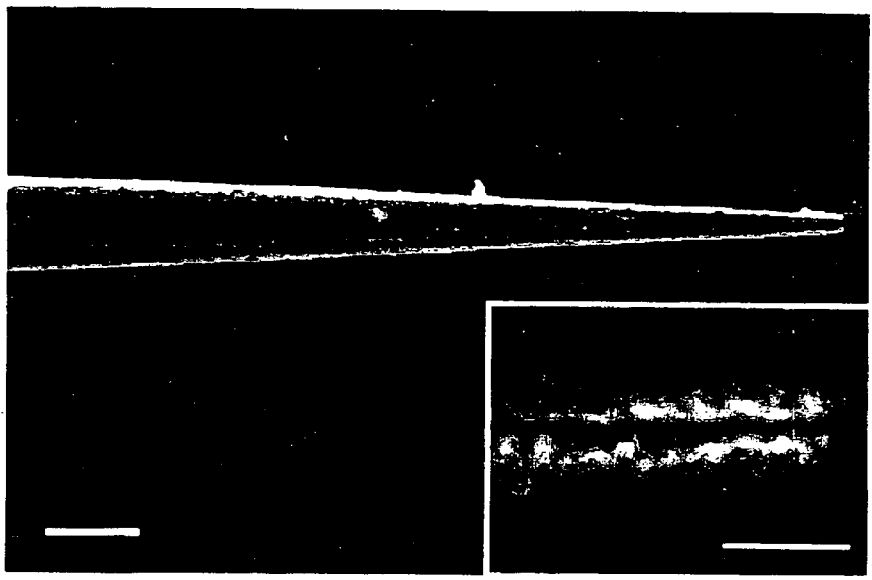
FIG. 6B shows free-standing, electrically-independent electrodes are deposited onto tapered glass micropipettes.
Figure 6C:
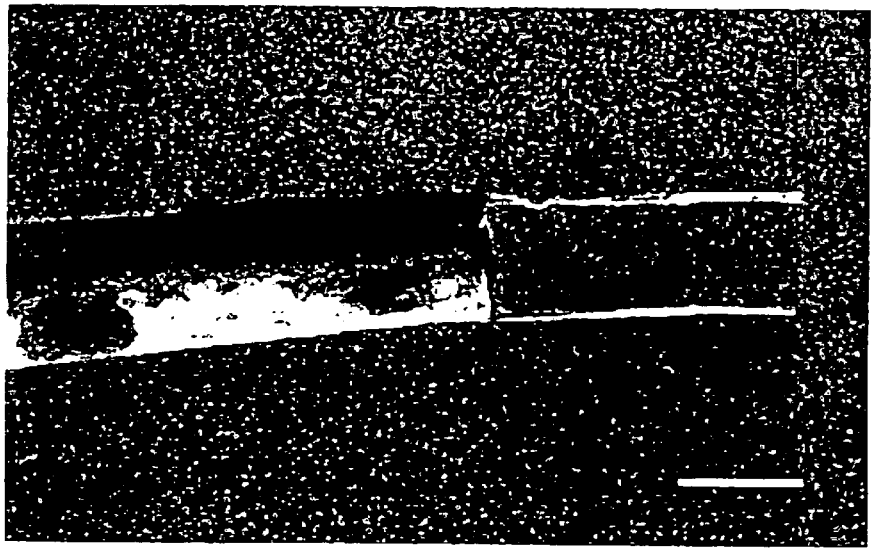
FIG. 6C is an SEM image of a nano-tweezers after mounting two MWNT bundles on each electrode (scale bar=2 $\mu$m)

A representative scanning electron microscopy (SEM) image of one of the thirty nanotube tweezers fabricated in this way (FIG. 6B) shows that the MWNT arms of the tweezers are about 4 µm long, with a diameter of only 50 nm. As the diameter or cross section of the arms constrains the size of objects that can be reliably grabbed, these new structures will hereinafter be referred to as nano-tweezers. The size of available nano-tweezers is limited by resolution of the microscope used to monitor the nanotube attachment process.

Figure 7F:
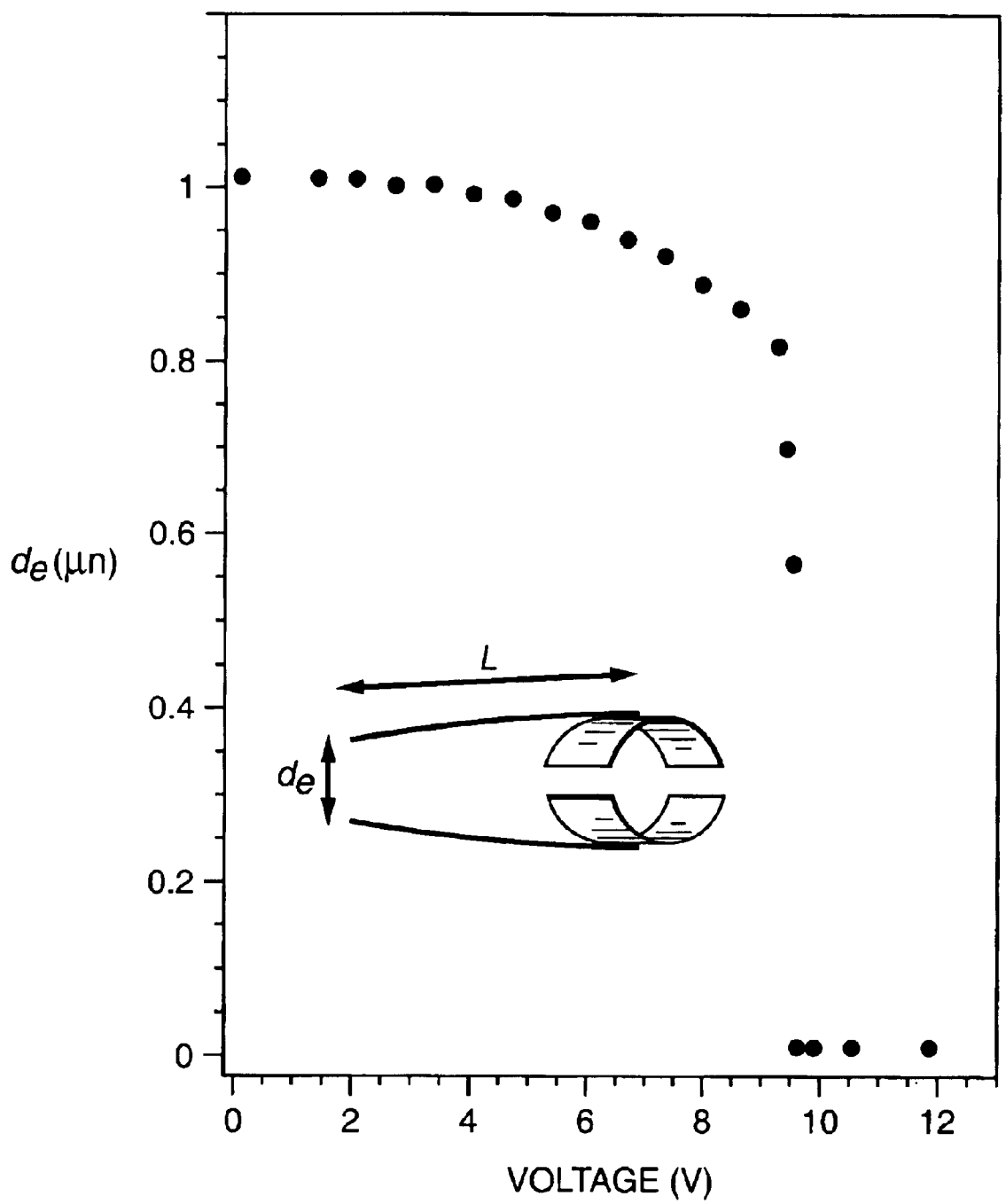
FIG. 7F show the voltage response of the carbon nano-tweezers Of FIGS. 7A–E calculated using eq.(1)

Referring now to FIGS. 7A–F, the electromechanical response of nanotube nano-tweezers was investigated by applying bias voltages to the electrodes while simultaneously imaging the nanotube displacements. As the bias voltage increases from 0 to 8.3 V (FIGS. 7A–E), the ends of the arms of the tweezers bend closer to each other from their relaxed position (0 V). The arms of the tweezers relax back to their original position when the applied voltage is removed, and this process was repeated more than ten times producing the same displacement each time within the optical microscope resolution limit. These results demonstrate that mechanical response is elastic, and thus that neither the nanotubes nor nanotube/electrode junctions deform plastically. At 8.3 V, the distance between the ends of the tweezers has decreased by about 50% of the initial value, and as the voltage is increased further to 8.5 V, the arms of the tweezers suddenly close (FIG. 7E). The nano-arms of the tweezers typically remain closed after removing the actuating voltage due to a second potential minimum at contact produced by the Van der Waals interaction between the two nanotubes that form the arms of the tweezers. The nano-tweezers can, however, be readily opened by applying a voltage of the same polarity to both arms of the tweezers relative to a nearby ground electrode.

Simulations were performed to better understand the response and sudden closure of the nano-tweezers. The operating principle of the nano-tweezers is to balance the elastic energy cost with the electrostatic energy gain. The deformation of the beams at a given bias voltage, V, is determined by equating the elastic force of the beams with the electrostatic force along the beams. Let y(x) designate deflected distance of the tweezer arm from the equilibrium position at x, where x is the distance along a relaxed tweezer arm from the electrode. The static equilibrium shape of tweezer y(x) at bias voltage V is obtained by minimizing the free energy $$G_{tot}\{y\} = -\frac{1}{2}C\{y\}V^2 + \frac{\pi E R^4}{4}\int_0^L \left(\frac{d^2 y}{dx^2}\right)^2 dx \quad (1)$$

with respect to y(x), where C{y} is the capacitance between the arms of the tweezers, and E, L and R are the Young's modulus, length and diameter of the tweezer arm, respectively. FIG. 7F shows a discontinuous step in the nanotube end separation above threshold voltage, $V_{th}$=9.4 V, which is close to the observed experimental value of 8.3 V. The voltage response of a carbon nano-tweezerss was calculated using eq. (1). The separation of the ends of the nanotube arms, de, is plotted as a function of applied voltage. The dimensions of the tweezers used in the calculation, L=5 µm, nanotube diameter=45 nm, are similar to the experimental structure, and the Young's modulus, 1 TPa, was determined independently in prior experiments. These simulations show that static equilibrium is maintained for V<$V_{th}$; that is, the electrostatic force exactly balances the elastic restoring force as observed experimentally. However, the nonlinear nature of the electrostatic force precludes equilibrium (until contact) for V>$V_{th}$, and thus explains the origin of the discontinuous step at closure.

Figure 8A:
FIGS. 8A–D show the manipulation of polystyrene nano-clusters containing fluorescent dye molecules using nano-tweezers.
Figure 8B:
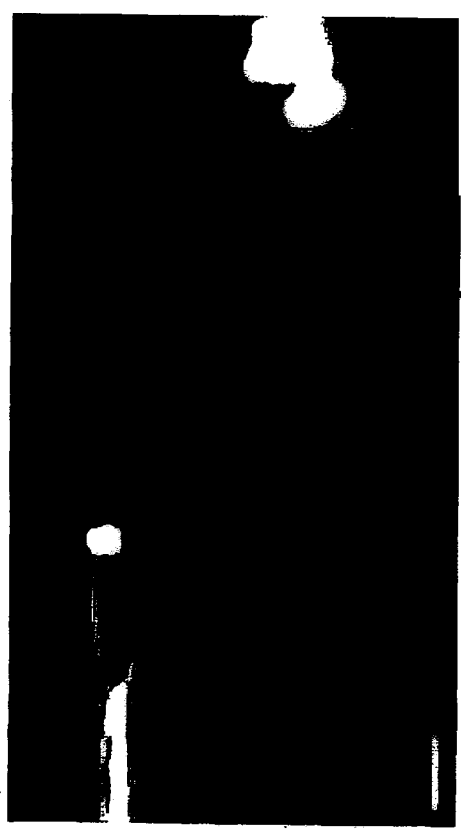
Figure 8C:
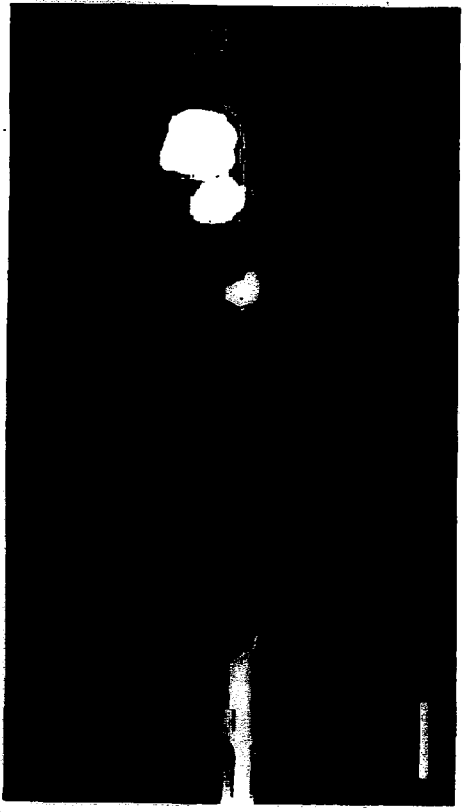
Figure 8D:
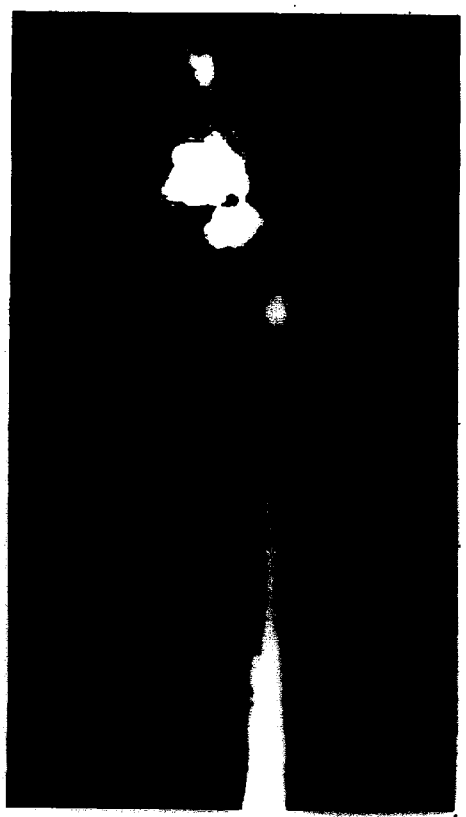

The power of the novel nanotube nano-tweezers has been explored by manipulating and probing nanostructures. Referring now to FIGS. 8A–D, optical micrographs show the sequential process of manipulation of polystyrene nanoclusters containing fluorescent dye molecules using nano-tweezers, with the spheres being grabbed and picked up. The emission from the dye molecules within the beads enables these submicron structures to be readily observed in an optical microscope. Under dark-field illumination, the nano-tweezers is moved to a group of supported clusters (FIG. 8A), and the arms of the tweezers are aligned with a small cluster. A voltage is applied to nano-tweezers arms positioned near the nanocluster, and the nano-tweezers and cluster are moved away from the sample support (FIGS. 8C, D). The scale bars are 2 µm. An SEM analysis of this nanostructure shows that it has a diameter of 500 nm and contains several nanoclusters unresolved in the optical micrograph. These results demonstrate that nanostructures on the scale of cellular substructures can be readily grabbed and manipulated. Lastly, it should be noted that the adhesive force between a nanotube arm and the nanoclusters is not generally strong enough to move the nanoclusters-closure of the arms of the tweezers on the nanoclusters through an applied voltage is required to remove the nanoclusters reproducibly from the substrate or tip assembly.

Figure 9A:
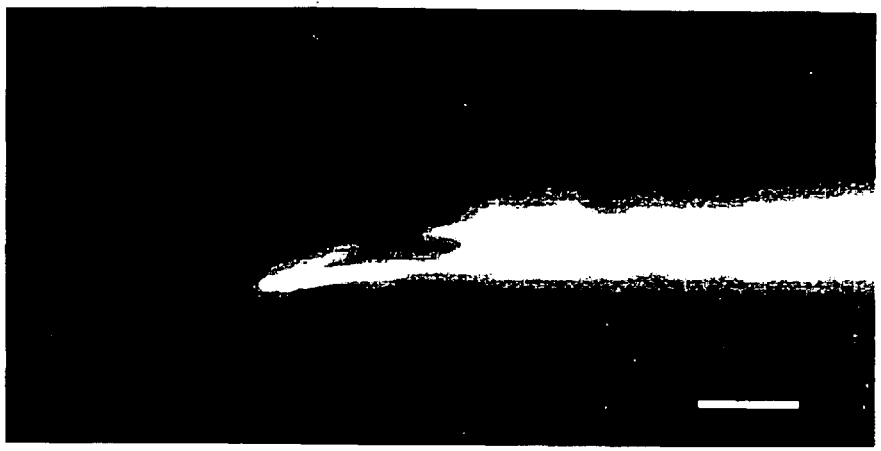
FIGS. 9A–C show optical micrographs of closed nanotube arms (FIG. 9A), nanotube nano-tweezers grasping doped $\beta$-SiC nanoclusters (FIG. 9B) and GaAs nanowires (FIG. 9C) (scale bars=2 $\mu$m)
Figure 9B:
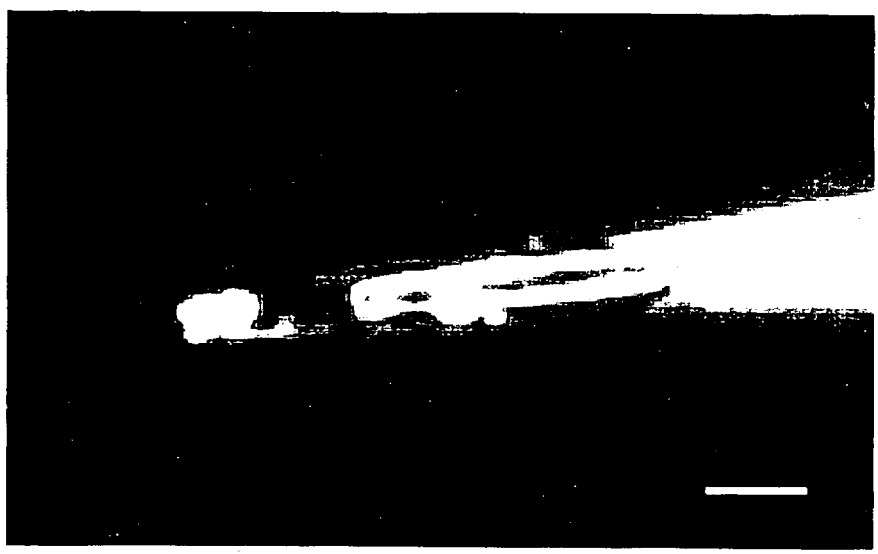
Figure 9C:
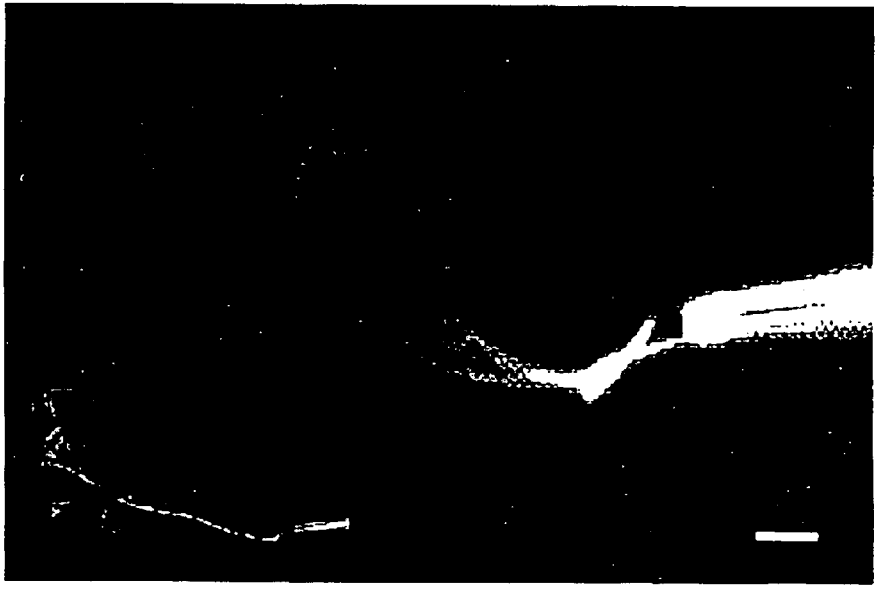
Figure 9D:
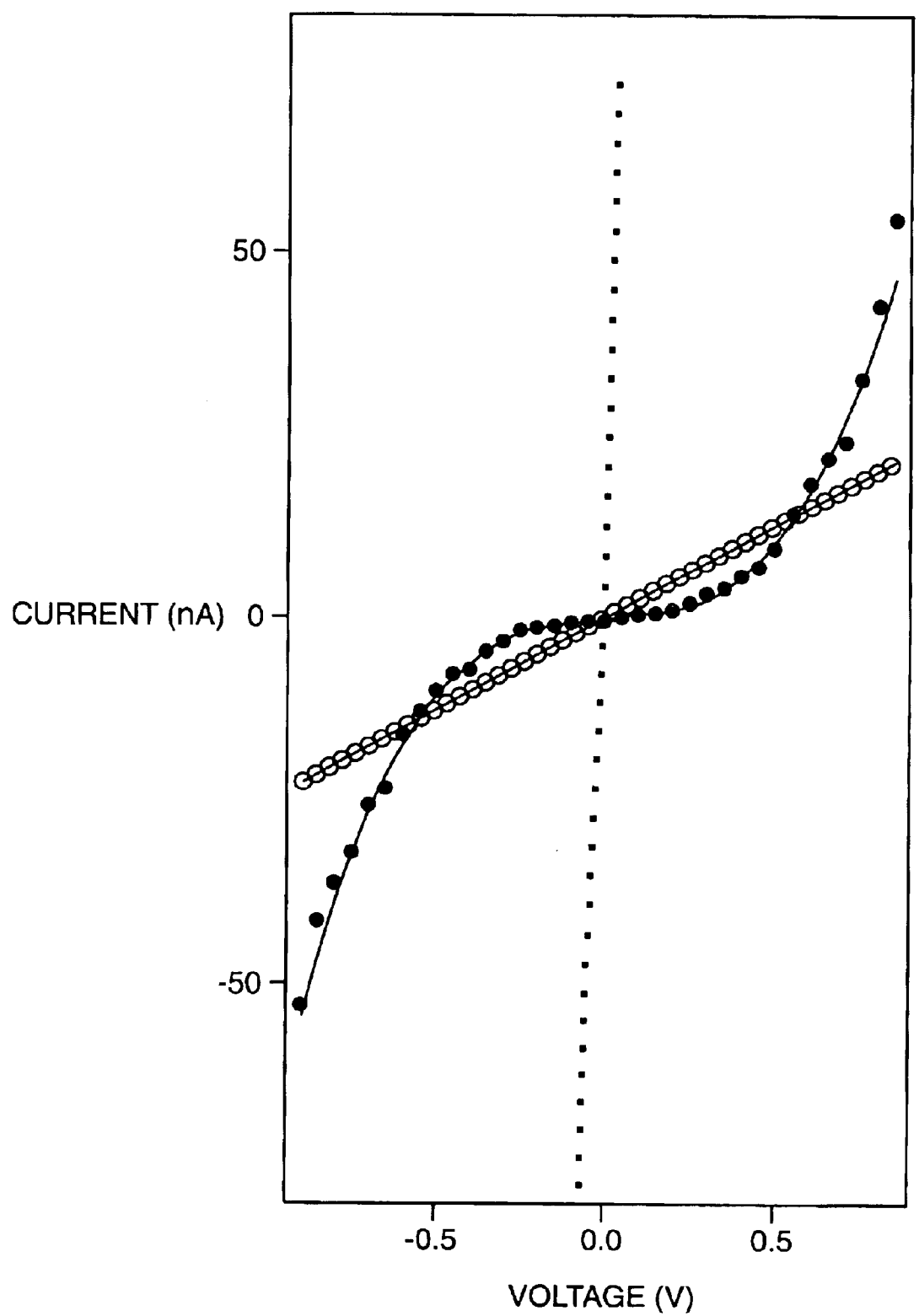
FIG. 9D shows current versus voltage data recorded on the devices shown in FIGS. 9A–C.
Figure 10:
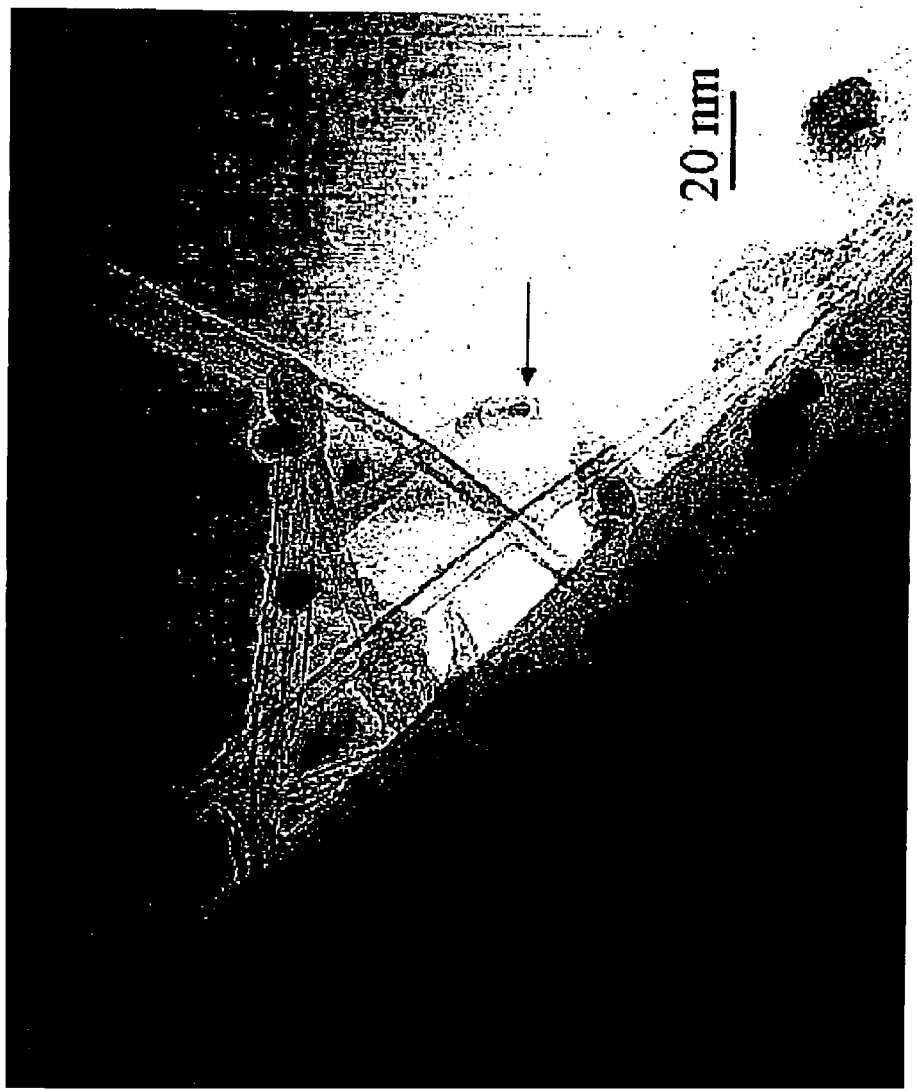
FIG. 10 shows a TEM picture of ethylene CVD large tube synthesis using FeOx 6L as catalyst.
Figure 11:
FIG. 11 shows a TEM picture of SWNTs synthesis using CO CVD and FeOx 2L as catalyst.
Figure 12:
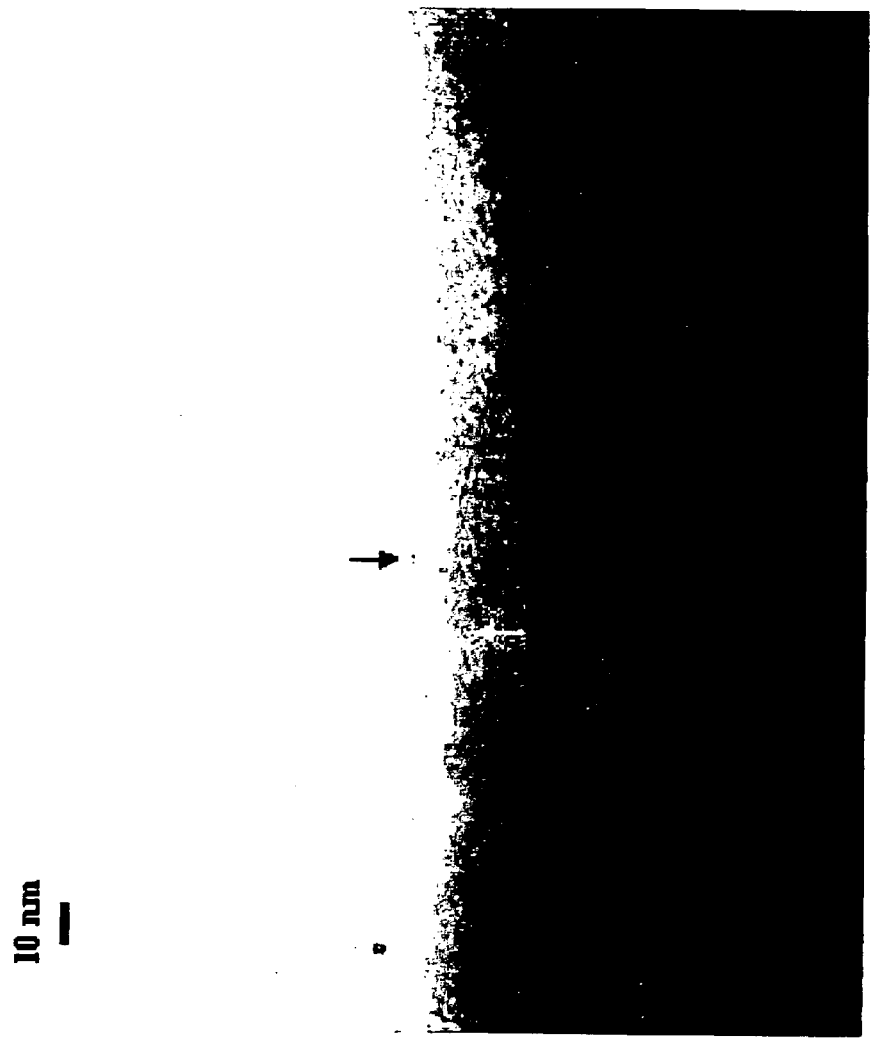
FIG. 12 shows a TEM picture of SWNTs grown with CO, using FeOx 2L as catalyst.
Figure 13:
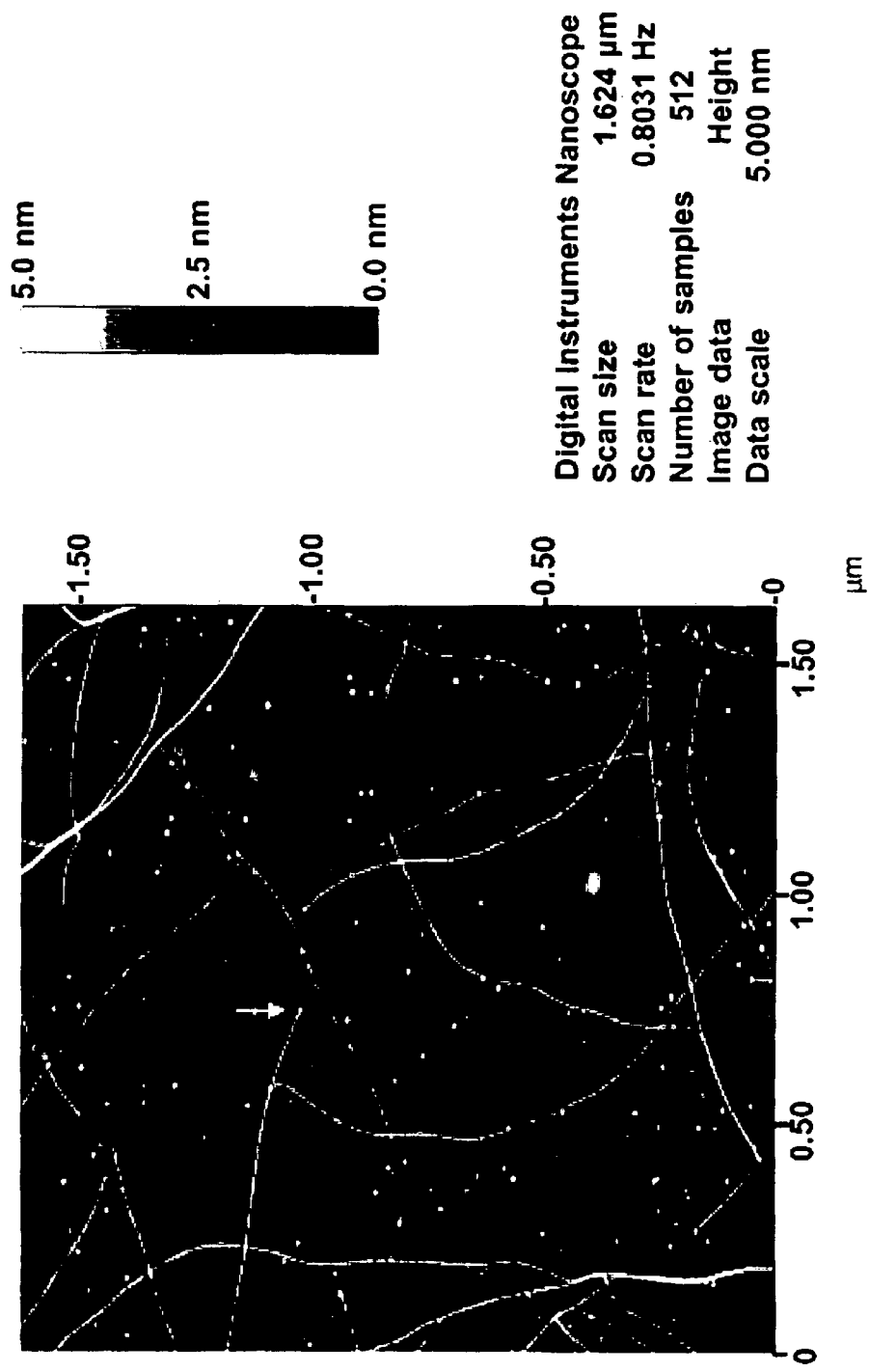
FIG. 13 shows an AFM picture of a medium-sized SWNT synthesized using FeOx 6L as catalyst.
Figures 15A, 15B:
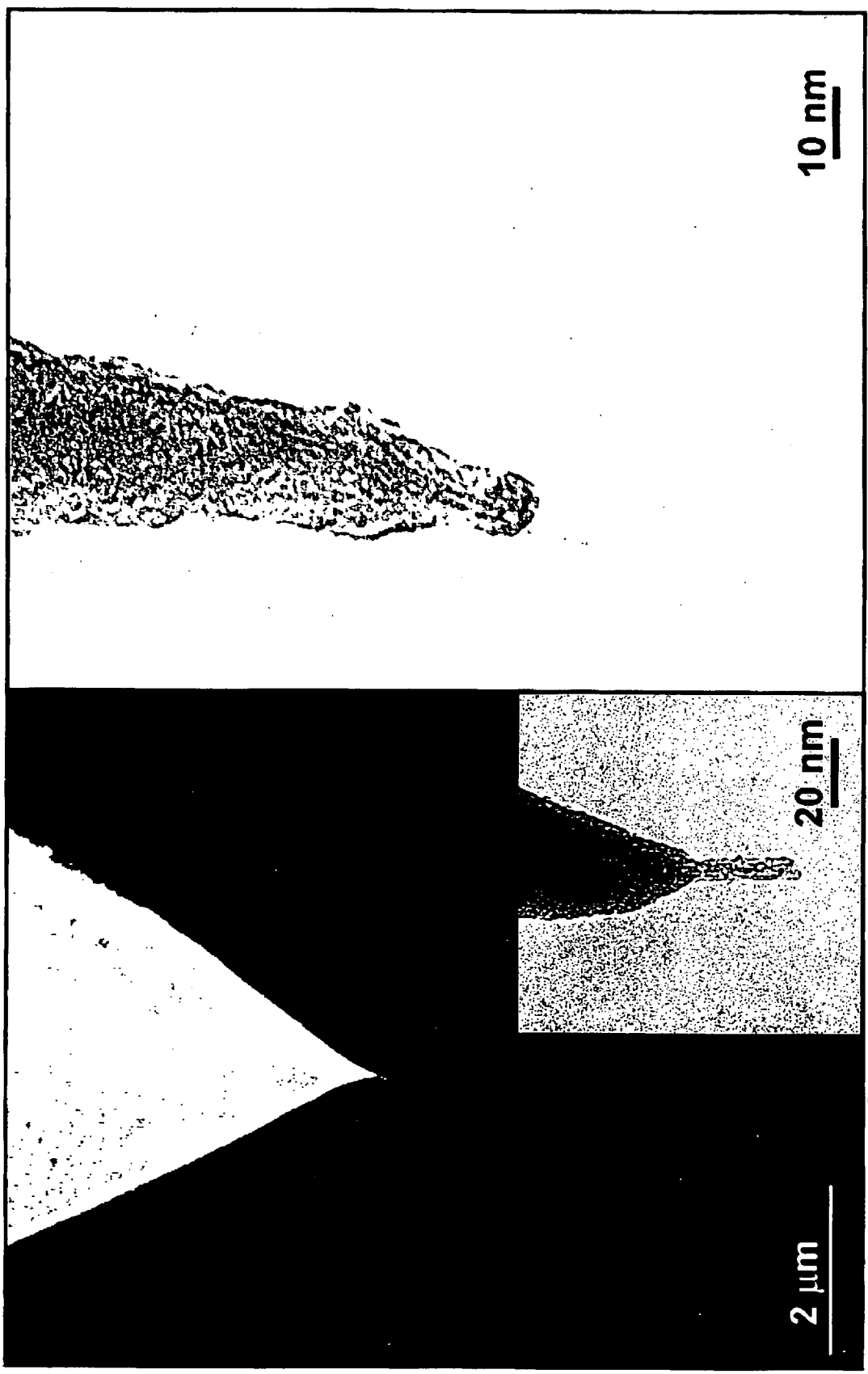
FIG. 15($a$) shows a SEM image of a 5.8 $\mu$m long SWNT bundle tip—the inset shows a SWNT bundle tip shortened for high-resolution imaging with length of 29 nm and diameter of 7.4 nm; (b) shows an individual 2.2 nm diameter, 10 nm long tube prepared by the methods of the present invention.

According to another feature of nano-tweezers, once a nanoscale object has been grasped by the nanotube nano-tweezers, its electrical properties can be probed since the nanotube arms serve as conducting wires to the nanoscale object. Optical images of nano-tweezers closed without a sample and grasping doped β-SiC nanoclusters and a GaAs nanowire are shown in FIGS. 9A, B and C, respectively. The β-SiC nanocluster (FIG. 9B) and GaAs nanowire (FIG. 9C) samples were grabbed and removed from supports using the approach described above. In the case of GaAs nanowires, extension and removal of single wires from the entangled sample shows clearly the power of a tweezers device. FIG. 4D depicts the current (I) versus voltage (V) characteristics of these structures. The dotted line corresponds to the closed nanotube nano-tweezers, open circles to the β-SiC nanoclusters, and solid circles correspond to the GaAs nanowire. Ohmic (linear I–V) behavior was observed for the closed nanotube and β-SiC nanoclusters with resistances of 600 (±10) kΩ and 39 (±0.1) MΩ, respectively, where the numbers in parenthesis represent the standard deviation. The solid line through the filled circles corresponds to a highly nonlinear (cubic) I–V characteristic indicative of tunneling electron transport through the insulating oxide layer on the GaAs nanowires. The measured resistances agree well with independent measurements of nanotube junctions and doped β-SiC crystals.

While the invention has been disclosed in connection with the preferred embodiments shown and described in detail, various modifications and improvements thereon will become readily apparent to those skilled in the art. For example, the nano-tweezers may be useful for fabricating new types of quantum dot and quantum wire structures that cannot be prepared by, for example, colloidal crystallization. Nano-tweezers could also be useful as an electromechanical sensor for detecting pressure or viscosity of media by measuring the change of resonance frequency and Q-factor of the device, or as a two-tip STM or conducting AFM probe. The nanotube nano-tweezers may also provide exciting opportunities for manipulation and modification of biological systems such as structures within a cell.

EXEMPLIFICATION

The invention now being generally described, it will be more readily understood by reference to the following examples, which are included merely for purposes of illustration of certain aspects and embodiments of the present invention, and are not intended to limit the invention.

EXAMPLE 1
Catalyst Preparation: $FeO_x$ 2L $FeO_x$ 2L is a type of ferrihydrite. The "2L" designates that the powder x-ray diffractogram for this type exhibits only 2 lines. The catalyst is prepared by adding 0.333 g of iron(III) nitrate nonahydrate to 50 ml of water and rapidly stirring the solution. 0.1386 g of sodium bicarbonate is then added to the solution. The solution is let stirring for an additional 10 minutes. The solution is then diluted 200 to 400 times with ethanol or isopropanol for deposition of the iron catalyst onto the surfaces of the cantilever assembly. This novel dilution step with alcohol is critical for deposition of catalyst onto the sample. The size of the catalyst typically ranges approximately from 1.5 to 3.5 nm in diameter.

EXAMPLE 2
Catalyst Preparation: $FeO_x$ 6L $FeO_x$ 6L is a type of semi-crystalline iron oxide having a powder x-ray diffractogram with 6 lines. The catalyst is prepared by adding 0.5 g of $Fe(NO_3)_3 \cdot 9H_2O$ 50 ml of water at 75° C. The solution is stirred rapidly and then put in an oven for 10–12 min. at 75° C. Afterwards, the solution is cooled rapidly by immersion into ice water and then dialyzed in a 100 kDa dialysis tube for 1–3 days with several exchanges of DI water. The size of the catalyst typically ranges approximately from 4 to 6 nm in diameter. The solution is then diluted 200 to 1600 times with ethanol or isopropanol for deposition of the iron catalyst onto the surfaces of the cantilever assembly.

EXAMPLE 3
Catalyst Preparation: Colloidal

For colloidal catalyst deposition, the cantilever assembly or at least the tip is first dipped into the dilute ethanol or isopropanol solution of the catalyst (200 to 1600 times, depending on the catalyst) for 5–10 seconds. The assembly is then dipped in hexane for approximately 10 seconds and dried in air.

EXAMPLE 4
Synthesis of Iron Colloid Particles

Catalytic iron colloid particles of 3 nm(3.2+/–0.8), 9 nm(9.0+/–0.9) and 13 nm(12.6+/–1.7) diameters were synthesized by thermal decomposition of iron pentacarbonyl $(Fe(CO)_5)$ in the presence of alkanoic acid or alkenoic acid ligands at the reflux temperature of the organic solvent, with modification to published methods. Typically, for the synthesis of 3 nm iron particles, 1.18 g (5 mmole) of $Fe(CO)_5$ was first added to 15.4 ml of 66 mM oleic acid (1 mmole) in 1,2-dichlorobenzene at 110° C. under nitrogen. The resulting solution was then refluxed at 180° C. for 1 hour to facilitate a thorough decomposition of the organometallic iron. For the synthesis of 9 nm iron particles, 197 mg (1 mmole) of $Fe(CO)_5$ was added to 5 ml of 0.5M lauric acid (2.5 mmole) in dioctyl ether at 110° C. under nitrogen, followed by refluxing at 270° C. for 2 hours. The synthesis of 12 nm iron particles was similar to the one for 9 nm iron particles, except that same molar ratio of octanoic acid was used instead of lauric acid and the refluxing time was extended to 3 hours. A wider range of iron particles with diameters from 3–8 nm was also synthesized with oleylamine and oleic acid in a method similar to those above.

EXAMPLE 5
CVD Growth Conditions: 0.8–2.5 nm Diameter SWNT

The catalyst used is $FeO_x$ 2L. Hydrogen (400 sccm) and argon (600 sccm) are flowed and the sample is heated to 700° C. The catalyst is annealed at 700° C. for 500 seconds. Then the samples is heated at a rate of 15° C./min to 850° C. The hydrogen and argon are replaced in the system with carbon monoxide (1200–2000 sccm) for 10 min. The carbon monoxide is replaced with argon (600 sccm) and let the furnace cool down to room temperature.

EXAMPLE 6
CVD Growth Conditions: 1.5–3.5 nm SWNT

The catalyst used is $FeO_x$ 6L. Hydrogen (400 sccm) and argon (600 sccm) are flowed and the sample is heated to 700° C. The catalyst is annealed at 700° C. for 500 seconds. Then the samples is heated at a rate of 15° C./min to 800° C. Ethylene is added (4 sccm) to the system for 10 mins. Then, the hydrogen and ethylene are replaced with argon (600 sccm) and the furnace cooled down to room temperature.

EXAMPLE 7
CVD Growth Conditions: 3–6 nm SWNT

The catalyst used is $FeO_x$ 6L. Hydrogen (400 sccm) is flowed and the sample is heated to 700° C. The catalyst is annealed at 700° C. for 500 seconds. Then the sample is heated at a rate of 15° C./min to 800° C. Ethylene is added (4 sccm) to the system for 10 mins. Then, the hydrogen and ethylene are replaced with argon (600 sccm) and the furnace cooled down to room temperature.

EXAMPLE 8
SWNT Tips by CVD Growth

The catalysts were electrophoretically deposited onto FESP (force modulation etched silicon probe, k=0.5–5 N/m, Digital Instruments, Santa Barbara, Calif.) silicon AFM tips from 0.1% ethanol ($Al_2O_3$-supported Fe—Mo catalyst, –1.8V) or 0.1% aqueous (1.5–4 nm Fe-oxide, –0.5V) solutions. CVD was carried out with the tips in a 1-inch reactor connected to Ar, $H_2$ and $C_2H_4$ sources. The tips were heated at 15° C./min to 800° C. in a flow of 600 sccm Ar and 400 sccm $H_2$. At 750° C., 2 sccm of $C_2H_4$ was added for 3 min, and then the furnace cooled at 15° C./min in 1000 sccm Ar.

These conditions were specifically chosen to favor the growth of SWNTs and small diameter MWNTs (<10 nm), and it should be noted that well-defined changes in the ratio of $C_2H_4:H_2:Ar$ can be used to controllably tune the growth of nanotube tips from SWNTs to large MWNTs.

INCORPORATION BY REFERENCE

All of the patents and publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A method of producing nano-tweezers comprising at least two carbon nanotube tips, comprising the steps of:

providing a tip assembly;

applying at least two independent electrodes to the tip assembly; and applying at least one carbon nanotube tip to each of the electrodes to produce a nanotweezer, wherein the spacing between respective end portions of the carbon nanotube tips changes in response to a voltage applied between the at least two electrodes; wherein applying the at least one carbon nanotube tip comprises the steps of:

applying metallic catalytic material to at least one electrode; and inserting said at least one electrode into a CVD reactor; and exposing said at least one electrode to a gaseous atmosphere comprising a carbon containing gas, thereby producing at least one electrode bearing a carbon nanotube tip.

2. The method of claim 1, wherein the carbon nanotube tip is a single SWNT.

3. The method of claim 1, wherein the carbon nanotube tip comprises a plurality of SWNTS.

4. The method of claim 1, wherein the carbon nanotube tip is a MWNT.

5. A method of fabricating nanotube-based nanostructures by controlled deposition of nanotube segments comprising the steps of:

biasing a tip assembly bearing a carbon nanotube tip at a starting location on a substrate at a predetermined voltage;

scanning the tip assembly bearing a carbon nanotube tip along a predetermined path; and applying a voltage pulse at a higher voltage than the predetermined voltage thereby disconnecting the nanotube tip from tip assembly and depositing a nanotube segment on the substrate.

6. The method of claim 5, wherein the nanotube tip is a single wall nanotube.

* * * * *